(12) United States Patent
Ausserlechner

(10) Patent No.: US 8,797,024 B2
(45) Date of Patent: Aug. 5, 2014

(54) SENSOR

(75) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 433 days.

(21) Appl. No.: 13/018,962

(22) Filed: Feb. 1, 2011

(65) Prior Publication Data

US 2012/0194175 A1 Aug. 2, 2012

(51) Int. Cl.
*G01R 33/07* (2006.01)
*G01R 3/00* (2006.01)
*G01P 3/487* (2006.01)
*G01B 7/14* (2006.01)
*G01R 33/09* (2006.01)

(52) U.S. Cl.
USPC ............. 324/207.14; 324/207.24; 324/207.25

(58) Field of Classification Search
USPC .................................................... 324/207.14
See application file for complete search history.

(56) References Cited

U.S. PATENT DOCUMENTS

| 5,497,082 | A | * | 3/1996 | Hancock | 324/207.14 |
| 6,066,947 | A | | 5/2000 | Tamura | |
| 2005/0258820 | A1 | * | 11/2005 | Forster | 324/165 |
| 2009/0128282 | A1 | * | 5/2009 | Zimmer et al. | 338/32 R |
| 2010/0072988 | A1 | | 3/2010 | Hammerschmidt et al. | |

FOREIGN PATENT DOCUMENTS

DE 19810218 A1 10/1998
DE 10214524 A1 10/2003

* cited by examiner

*Primary Examiner* — Melissa Koval
*Assistant Examiner* — Stephen G Armstrong
(74) *Attorney, Agent, or Firm* — Eschweiler & Associates, LLC

(57) ABSTRACT

The present invention is directed to a sensor with a body and a magnetic field sensor. The body includes a plurality of structures arranged in a first direction to effect a periodically varying magnetic field upon movement of the body in the first direction. The magnetic field sensor is configured to detect components of the magnetic field in a second direction and in a third direction, wherein the magnetic field sensor is arranged adjacent to the body such that the second direction is perpendicular to the first direction and such that the third direction is perpendicular to the first direction and to the second direction.

35 Claims, 19 Drawing Sheets

SENSOR

FIELD

The present invention relates to a sensor. Some embodiments relate to a sensor with a body and a magnetic field sensor. Some embodiments relate to a rotation sensor with a wheel and a magnetic field sensor. Some embodiments relate to an improved GMR-speed-sensor.

BACKGROUND

Sensors can be used for a variety of applications, such as for detecting a position, speed, or acceleration of a body.

For example, with respect to rotation sensors, the body might be a wheel attached to a shaft, wherein the sensor is used for detecting a rotational position, angle, speed or acceleration of the shaft.

SUMMARY

Embodiments of the present invention provide a sensor with a body and a magnetic field sensor. The body comprises a plurality of structures arranged in a first direction to effect a periodically varying magnetic field upon movement of the body in the first direction. The magnetic field sensor is configured to detect components of the magnetic field in a second direction and in a third direction, wherein the magnetic field sensor is arranged adjacent to the body such that the second direction is perpendicular to the first direction and such that the third direction is perpendicular to the first direction and to the second direction.

Embodiments of the present invention provide a (rotation) sensor comprising a wheel and a magnetic field sensor. The wheel comprises a plurality of azimuthally distributed structures to effect a periodically varying magnetic field upon rotation of the wheel. The magnetic field sensor is configured to detect components of the magnetic field in a second direction and in a third direction, wherein the magnetic field sensor is arranged adjacent to the wheel such that the second direction corresponds to a direction of the axis of the wheel and the third direction corresponds to a radial direction of the wheel.

Further embodiments of the present invention provide a method for measuring a movement of a body, wherein the body comprises a plurality of structures arranged in a first direction to effect a periodically varying magnetic field upon movement of the body in the first direction. The method comprises detecting components of the magnetic field in a second direction and in a third direction with a magnetic field sensor, wherein the magnetic field sensor is arranged adjacent to the wheel such that the second direction is perpendicular to the first direction and such that the third direction is perpendicular to the first direction and to the second direction.

Some embodiments of the present invention provide a method for manufacturing a sensor. In a first step, a body is provided with a plurality of structures arranged in a first direction to effect a periodically varying magnetic field upon movement of the body in the first direction. In a second step, a magnetic field sensor configured to detect components of the magnetic field in a second direction and in a third direction is provided, wherein the magnetic field sensor is arranged adjacent to the wheel such that the second direction is perpendicular to the first direction and such that the third direction is perpendicular to the first direction and to the second direction.

BRIEF DESCRIPTION OF THE DRAWINGS

Embodiments of the present invention are described herein making reference to the appended drawings.

Figure 1:
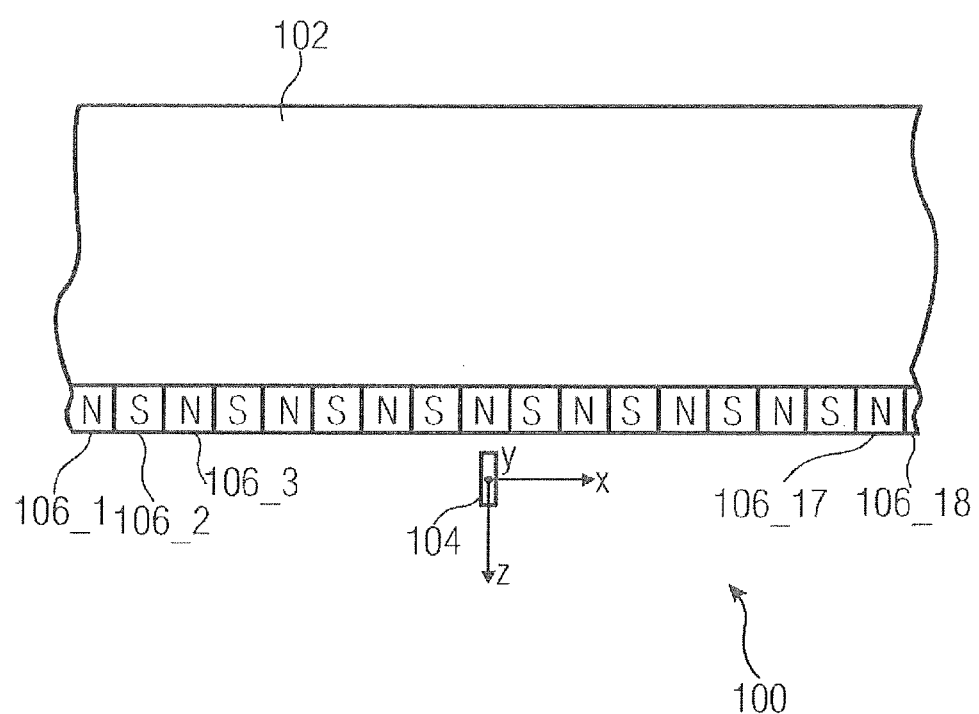
FIG. 1 shows an illustrative view of an embodiment of a sensor with a body and a magnetic field sensor.

Equal or equivalent elements or elements with equal or equivalent functionality are denoted in the following description by equal or equivalent reference numerals.

DETAILED DESCRIPTION

Features of the different embodiments described hereinafter may be combined with each other, unless specifically noted otherwise.

FIG. 1 shows an illustrative view of an embodiment of a sensor 100 with a body 102 and a magnetic field sensor 104. Thereby, only a small portion of the body 102 is shown, the small portion comprising a plurality of structures 106_1 to 106_18 arranged in a first direction to effect a periodically varying magnetic field upon movement of the body 102 in the first direction. The magnetic field sensor 104 is configured to detect components of the magnetic field in a second direction and in a third direction, wherein the magnetic field sensor 104 is arranged adjacent to the body 102 such that the second direction is perpendicular to the first direction and such that the third direction is perpendicular to the first direction and to the second direction.

The appended drawings show an x-y-z-reference coordinate system with an x-axis, a y-axis and a z-axis perpendicular to each other. The y-axis and the z-axis define a vertical plane or vertical dimension parallel to the active or sensitive area of the magnetic field sensor 104. The x-axis defines a lateral dimension perpendicular to the active or sensitive area of the magnetic field sensor 104.

In some embodiments the magnetic field sensor 104 is arranged adjacent to the body 102 such that the active or sensitive area (free layer) of the magnetic field sensor 104 is arranged parallel to a plane defined by the second direction (y-axis of the reference coordinate system) and the third direction (z-axis of the reference coordinate system). The detected magnetic field components in the second direction ($B_Y$) and in the third direction ($B_Z$) are in phase, wherein a magnetic field component in a first direction ($B_X$, x-component of the magnetic field at the magnetic field sensor 104) perpendicular to the second direction and to the third direction is 90° out of phase. Due to the arrangement of the magnetic field sensor 104, the magnetic field component in the first direction ($B_X$) is perpendicular to the active or sensitive area (free layer) of the magnetic field sensor 104 and therefore irrelevant. Hence, the magnetic field component in the second direction ($B_Y$) cannot cause an undesired rotation of a magnetization of the free layer that may lead to a discontinuous jump in the resistance of the magnetic field sensor 104.

As exemplarily shown in FIG. 1, in some embodiments the structures 106_1 to 106_18 of the body 102 are magnetic poles arranged with alternating polarity. Alternatively, the sensor 100 may comprise a magnetic element arranged adjacent to the magnetic field sensor 104, where the structures 106_1 to 106_18 of the body 102 may comprise protrusions or recesses periodically formed at the body 102 in the second direction or in the third direction.

In FIG. 1, the number of structures is exemplarily chosen to be 18. Naturally, the body 102 can comprise up to n structures 106_1 to 106_n, where n may be a natural number, for example, between 50 and 70 or between 20 and 90.

Figure 2:
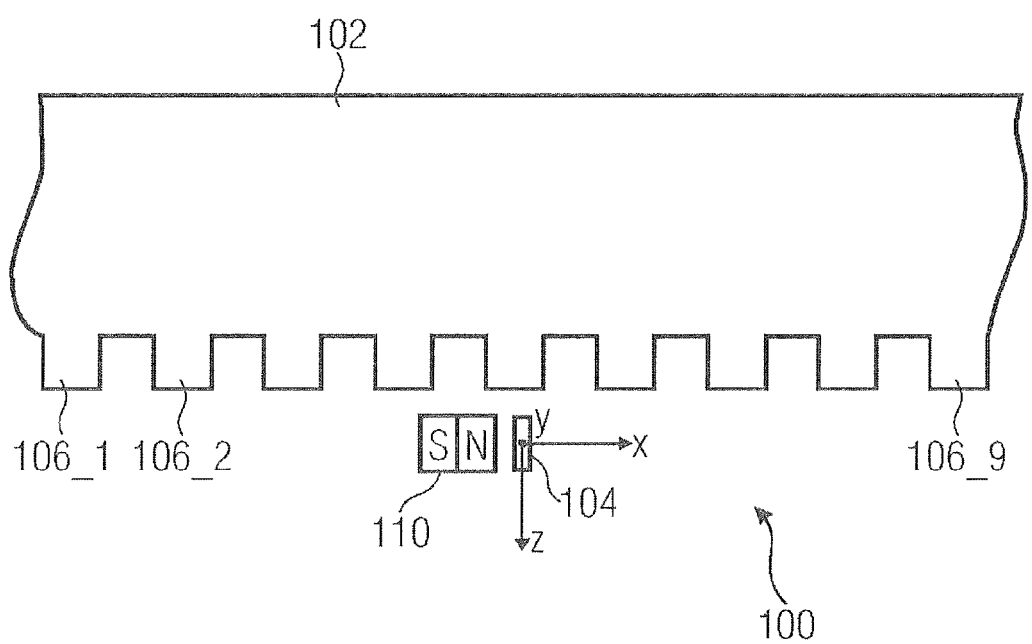
FIG. 2 shows an illustrative view of an alternative embodiment of the sensor with a body and a magnetic field sensor.

FIG. 2 shows an illustrative view of an alternative embodiment of the sensor 100 with a body 102 and a magnetic field sensor 104. In contrast to FIG. 1, the structures 106_1 to 106_9 of the wheel 102 periodically protrude from the body 102 in the third direction. Moreover, a magnetic element 110 comprising a magnetic north- and south-pole is arranged adjacent to the body 102 such that a magnetization vector of the magnetic element 110 is perpendicular to the active or sensitive area (free layer) of the magnetic field sensor 104. Hence, as shown in FIG. 2, the magnetic element 110 might be arranged on a line parallel to the x-axis of the reference coordinate system such that the magnetic north-pole of the magnetic element 110 is adjacent to the magnetic field sensor 104.

In one embodiment the body 102 may comprise a ferromagnetic material that deflects the magnetic field generated by the magnetic element 110, where the protrusions 106_1 to 106_9 periodically formed at the body 102 effect a varying magnetic field at the magnetic field sensor 104 upon movement of the body 102 in the first direction. In some embodiments, the material of the body 102 may comprise a relative permeability $\mu_r$ unequal to 1. Moreover, the material of the body 102 may be a soft magnetic material comprising a relative permeability $\mu_r$ greater than 1000 ($\mu_r > 1000$) such as steel or iron. In one embodiment, the body 102 may comprise a wheel.

In some embodiments the sensor 100 shown in FIGS. 1 and 2 may further comprise an evaluator configured to detect a sensor-signal of the magnetic field sensor 104. Moreover, the evaluator may be configured to evaluate a position, a velocity, or an acceleration of the body 102 based on the detected sensor-signal.

The magnetic field sensor 104 shown in FIGS. 1 and 2 may comprise an XMR-sensor, e.g. an anisotropic magneto resistive (AMR), a giant magneto resistive (GMR), a tunnel magneto resistive (TMR), or a colossal magneto resistive (CMR) sensor.

In the following, embodiments of the present invention are described, wherein the body 102 comprises the shape of a wheel, and wherein a relative movement between the body 102 and the magnetic field sensor 104 is caused by rotation of the body 102.

Figure 3:
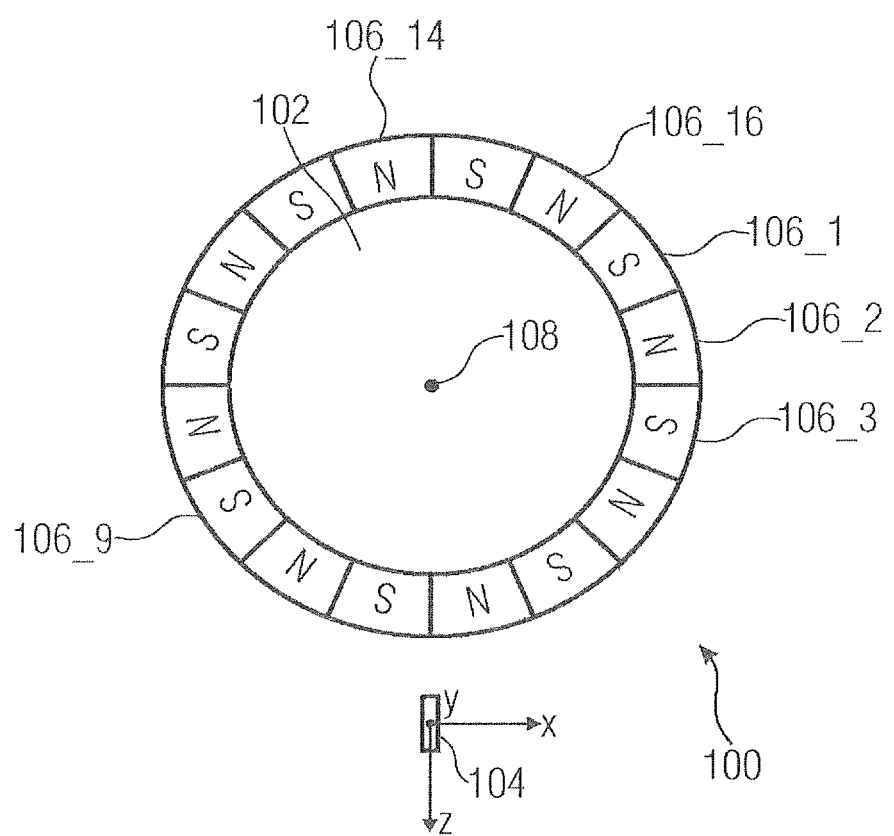
FIG. 3 shows an illustrative view of an embodiment of a (rotation) sensor with a wheel and a magnetic field sensor.

FIG. 3 shows an illustrative view of an embodiment of a (rotation) sensor 100 with a wheel 102 and a magnetic field sensor 104. The wheel 102 comprises a plurality of azimuthally distributed structures 106_1 to 106_16 to effect a periodically varying magnetic field upon rotation of the wheel 102. The magnetic field sensor 104 is configured to detect components of the magnetic field in a second direction and in a third direction, wherein the magnetic field sensor 104 is arranged adjacent to the wheel 102 such that the second direction corresponds to a direction of the axis 108 of the wheel 102 and the third direction corresponds to a radial direction of the wheel 102.

In some embodiments the magnetic field sensor 104 is arranged adjacent to the wheel 102 such that the active or sensitive area (free layer) of the magnetic field sensor 104 is arranged parallel to a plane defined by the axis 108 of the wheel 102 (y-axis of the reference coordinate system) and by the radial direction of the wheel 102 (z-axis of the reference coordinate system). In other words, the magnetic field sensor 104 is configured to detect components of the magnetic field in a second direction that corresponds to the direction of the axis 108 of the wheel 102 ($B_Y$, y-component of the magnetic field at the magnetic field sensor 104) and in a third direction that corresponds to the radial direction of the wheel 102 ($B_Z$, z-component of the magnetic field at the magnetic field sensor 104). The detected magnetic field components in the second direction ($B_Y$) and in the third direction ($B_Z$) are in phase, wherein a magnetic field component in a first direction ($B_X$, x-component of the magnetic field at the magnetic field sensor 104) perpendicular to the second direction and to the third direction is 90° out of phase. Due to the arrangement of the magnetic field sensor 104, the magnetic field component in the first direction ($B_X$) is perpendicular to the active or sensitive area (free layer) of the magnetic field sensor 104 and therefore irrelevant. Hence, the magnetic field component in the second direction ($B_Y$) cannot cause an undesired rotation of a magnetization of the free layer that may lead to a discontinuous jump in the resistance of the magnetic field sensor 104.

As exemplarily shown in FIG. 3, in some embodiments the azimuthally distributed structures 106_1 to 106_16 of the wheel 102 are magnetic poles arranged with alternating polarity. Or in other words, the wheel 102 shown in FIG. 3 is a magnetic pole-wheel comprising magnetic north- and south-poles arranged with alternating polarity. Alternatively, the (rotation) sensor 100 may comprise a magnetic element arranged adjacent to the magnetic field sensor 104, where the azimuthally distributed structures 106_1 to 106_n of the wheel may comprise protrusions or recesses periodically formed at the wheel 102 in the radial direction of the wheel 102 or in the direction of the axis 108 of the wheel 102.

In FIG. 3, the number of azimuthally distributed structures is exemplarily chosen to be 16. Naturally, the wheel 102 can comprise up to n azimuthally distributed structures 106_1 to 106_n, where n may be a natural number, for example, between 50 and 70 or between 20 and 90.

Figure 4:
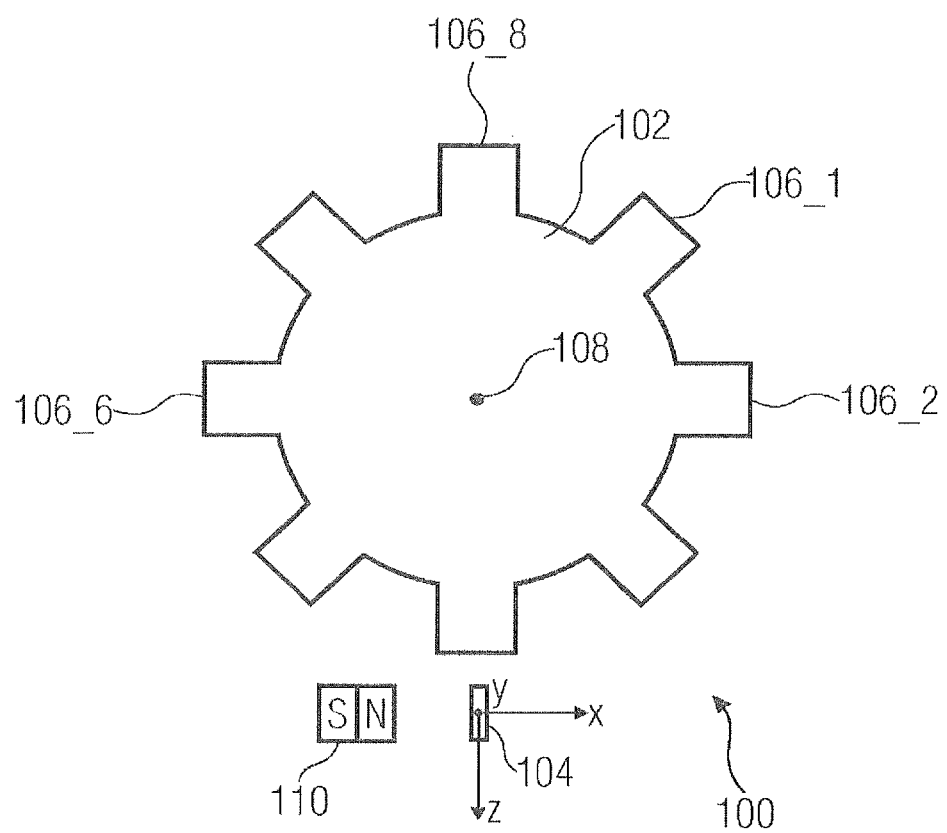
FIG. 4 shows an illustrative view of an alternative embodiment of the (rotation) sensor with a wheel and a magnetic field sensor.

FIG. 4 shows an illustrative view of an alternative embodiment of the (rotation) sensor 100 with a wheel 102 and a magnetic field sensor 104. In contrast to FIG. 3, the azimuthally distributed structures 106_1 to 106_8 of the wheel 102 periodically protrude from the wheel 102 in the radial direction of the wheel 102. Moreover, a magnetic element 110 comprising a magnetic north- and south-pole is arranged adjacent to the wheel 102 such that a magnetization vector of the magnetic element 110 is perpendicular to the active or sensitive area (free layer) of the magnetic field sensor 104. Hence, as shown in FIG. 4, the magnetic element 110 might be arranged on a line parallel to the x-axis of the reference coordinate system such that the magnetic north-pole of the magnetic element 110 is adjacent to the magnetic field sensor 104.

In one embodiment the wheel 102 may comprise a ferromagnetic material that deflects the magnetic field generated by the magnetic element 110, where the protrusions 106_1 to 106_8 periodically formed at the wheel 102 effect a varying magnetic field upon rotation of the wheel 102. In some embodiments, the material of the wheel 102 may comprise a relative permeability $\mu_r$ unequal to 1. Moreover, the material of the wheel 102 may be a soft magnetic material comprising a relative permeability $\mu_r$ greater than 1000 ($\mu_r$>1000) such as steel or iron.

In some embodiments the (rotation) sensor 100 shown in FIGS. 3 and 4 may further comprise an evaluator configured to detect a sensor-signal of the magnetic field sensor 104. Moreover, the evaluator may be configured to evaluate a position, a velocity, or an acceleration of the wheel 102 based on the detected sensor-signal.

The magnetic field sensor 104 shown in FIGS. 3 and 4 may comprise an XMR-sensor, e.g. an anisotropic magneto resistive (AMR), a giant magneto resistive (GMR), a tunnel magneto resistive (TMR), or a colossal magneto resistive (CMR) sensor.

In contrast to common magnetic field sensors such as Hall-sensors and magneto-resistive sensors, XMR-sensors 104 have a higher magnetic sensitivity. Therefore, they are preferred for the detection of an angular position or speed of a turning target wheel 102 in one embodiment.

The common feature of XMR-sensors 104 is that they have a free layer, which is a layer where the magnetization is free to move. The direction, in which the layer magnetization aligns, depends on the external magnetic field and on various anisotropy terms. One anisotropy term is determined by the geometrical shape of the XMR-sensor 104. For example, with GMR-sensors it is known that the shape anisotropy of the thin layered structure forces the magnetization into the plane of the free layer. Furthermore, if the GMR-sensor has the shape of a long strip then the shape anisotropy pulls the magnetization into the direction of the long side of the strip—this is the easy axis. If external fields with components in the plane of the GMR-sensor (in the sequel called "in-plane-fields") and perpendicular to the GMR-strip (GMR-sensor) are applied then they turn the magnetization out of the easy axis.

Figure 5:
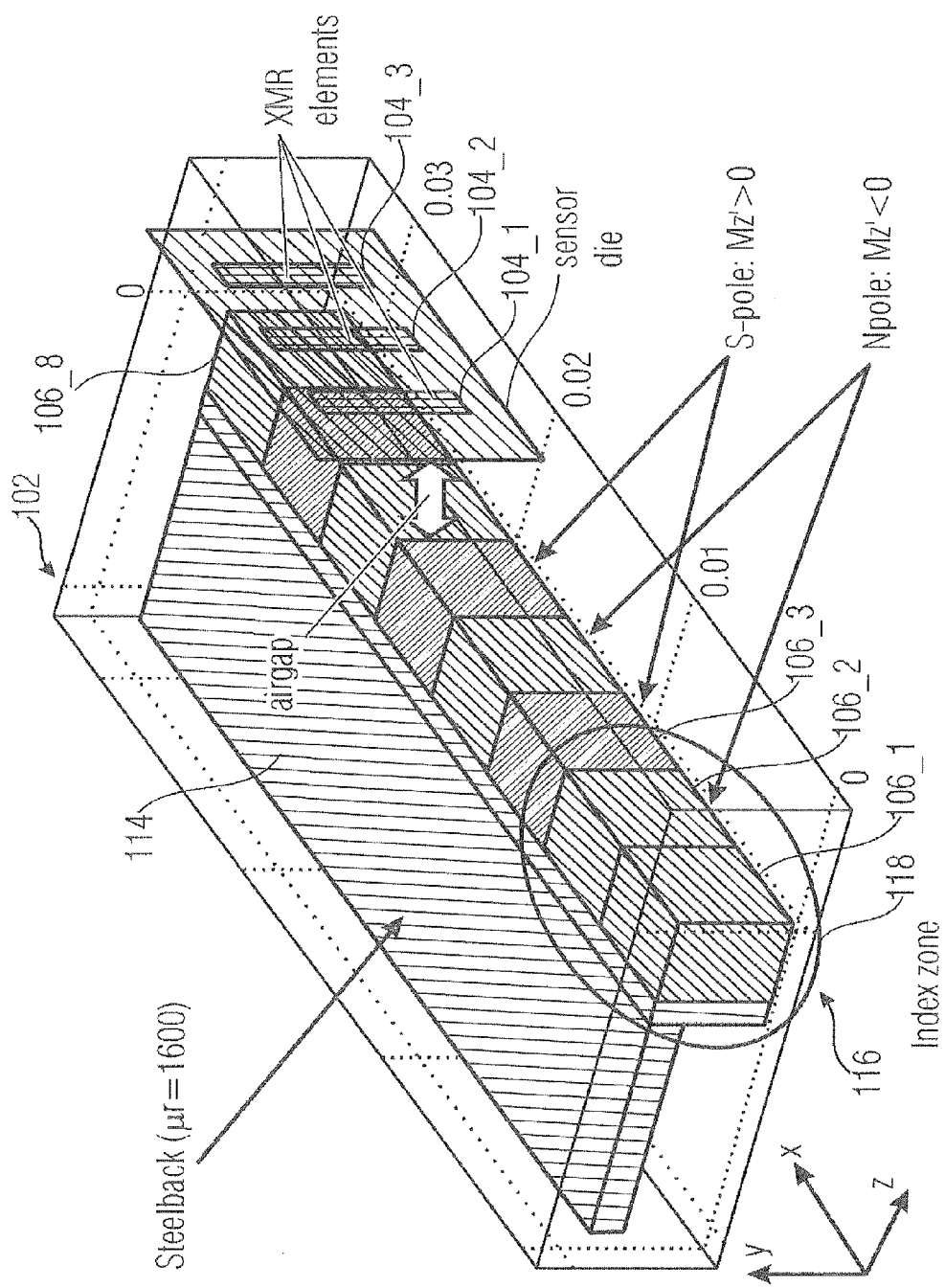
FIG. 5 shows a common rotation sensor with a pole-wheel and three XMR-sensors on a sensor die.

FIG. 5 shows a common rotation sensor with a pole-wheel 102 and three XMR-sensors 104_1 to 104_3 on a sensor die 112. In this figure only a small portion of the pole-wheel 102 is shown and the curvature is neglected. The magnetic pole-wheel may have several (usually 60) small permanent magnetic domains on its circumference generating an alternating magnetic field pattern. The magnetic field sensor detects the changes in the magnetic field when the pole-wheel rotates, thereby detecting e.g. the movement of a shaft.

The axis of rotation of the pole-wheel 102 is parallel to the y-axis, the tangential movement of the magnetic poles 106_1 to 106_8 is along the x-axis. The pole-wheel 102 comprises a support structure 114, such as a steel back, which attaches the pole-wheel 102 to the shaft and holds a permanent magnetic strip 116. The strip 116 comprises several domains (magnetic poles 106_1 to 106_8) where the magnetization points in positive and negative z-direction. The magnetization of the pole-wheel 102 is denoted with a prime ($M_z'$) in order to distinguish it from the unprimed magnetization ($M_Y$) of the XMR-sensors 104_1 to 104_3. FIG. 5 also shows a larger magnetic north-pole around x=0, which serves as an index zone 118. Usually the XMR sensors 104_1 to 104_3 are located on the surface of a semiconductor die 112.

In contrast to the embodiments of the present invention shown in FIGS. 3 and 4, the XMR-sensors 104_1 to 104_3 of the common rotation sensor shown in FIG. 5 are arranged such that the active or sensitive area (free layer) of the XMR-sensors 104_1 to 104_3 is parallel to a plane defined by the x-axis and the y-axis of the reference coordinate system. Or in other words, the XMR-planes (XMR-planes=planes of the free layer of the XMR-sensors 104_1 to 104_3) are identical to the x-y-plane, where the z-axis is perpendicular to the XMR-planes, and where the easy axis is identical with the y-axis.

Hence, the XMR-sensors 104_1 to 104_3 of the common rotation sensor shown in FIG. 5 are configured to detect components of the magnetic field in the direction of rotation of the wheel 102 ($B_X$, x-component of the magnetic field at the XMR-sensors 104_1 to 104_3) and in direction of the axis 108 of the wheel 102 ($B_Y$, y-component of the magnetic field at the XMR-sensors).

If the target wheel (wheel 102) comprises a plurality or multitude of small permanent magnets of alternating polarity then common rotation sensors with XMR-sensors 104_1 to 104_3 face the following problem. The field vector (vector of the magnetic field) on the XMR-sensors 104_1 to 104_3 generated or effected by the wheel 102 is rotating—i.e. it is composed of 2 orthogonal components parallel to the plane (or free layer) of the XMR-sensors 104_1 to 104_3 and both components are 90° out of phase. If they have equal amplitude then the field vector rotates on a circle—if they have different amplitude then the field vector rotates on an ellipse (which is usually the case). This causes the magnetization of the XMR-sensors 104_1 to 104_3 to jump whenever the magnetization crosses from one half-space to the other.

Ideally the magnetic field of a pole-wheel 102 on the XMR-sensors 104_1 to 104_3 should have only an x-component ($B_X$), where the y-component of the magnetic field should be equal to zero (By=0). In practice the spatial dependence of the x-component of the magnetic field ($B_X$) may be close to a sine-wave. This means that if the shaft rotates at constant speed the time dependence of the x-component of the magnetic field ($B_X$) on the XMR-sensors 104_1 to 104_3 is sinusoidal. Yet, for certain applications the pattern of magnetization on the pole wheel 102 is designed to have a certain asymmetry, which is called an index zone 118 or a reference zone. Mostly, the field pattern in the index zone is still close to sinusoidal, yet the period of the sine-wave is larger. Under these ideal circumstances the magnetization vector in the free layer of the XMR-element moves from the easy axis slightly to the left and right side according to the applied x-component of the magnetic field ($B_X$) from the pole-wheel 102.

In the following, the movement of the magnetization vector in the free layer of the XMR-sensors 104_1 to 104_3 slightly to the left and right from the easy axis is exemplarily described by means of a GMR-strip.

Figure 6:
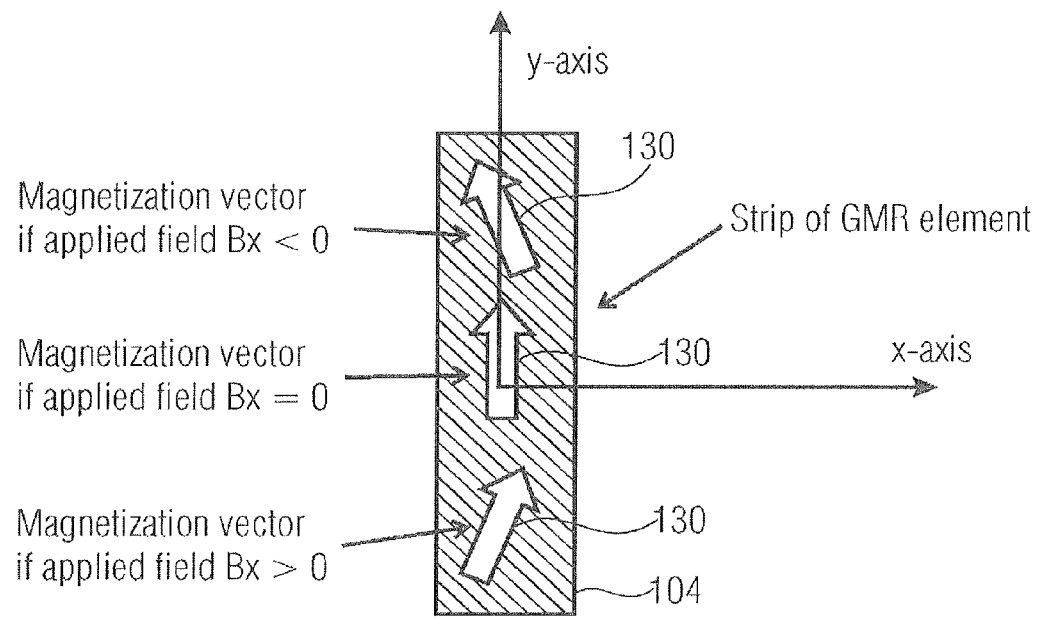
FIG. 6 shows an illustrative view of the orientation of the magnetization in a GMR-strip for different values of the applied x-component of the magnetic field.

FIG. 6 shows an illustrative view of the orientation of the magnetization in a GMR-strip for different values of the applied x-component of the magnetic field. As shown in FIG. 6, the orientation of the magnetization might be described by a magnetization vector 130. Applying a magnetic field with a negative x-component ($B_x<0$) to the GMR-strip leads to a magnetization vector 130 that comprises mainly a positive y-component and a small negative x-component. Applying a magnetic field with no x-component ($B_x=0$) to the GMR-strip leads to a magnetization vector 130 that comprises only a positive y-component. Applying a magnetic field with a positive x-component ($B_x>0$) to the GMR-strip leads to a magnetization vector 130 that comprises mainly a positive y-component and a small positive x-component.

As shown in FIG. 6, it is evident that the magnetization of the GMR-strip points up under all circumstances, or in other words, the magnetization vector 130 does not change its half-space—it stays in the upper half-space (of the reference coordinate system).

In practice the pole-wheel 102 has a magnetic field with a y-component greater or smaller than zero ($B_Y< >0$) and a z-component greater or smaller than zero ($B_Z< >0$)—there are only very few locations (e.g. symmetry planes of the pole-wheel 102) where the y-component of the magnetic field is zero ($B_Y=0$). The situation is all the more severe considering assembly tolerances of the XMR-sensors 104_1 to 104_3 with respect to the pole-wheel 102 and considering manufacturing tolerances of the pole-wheel 102.

Subsequently, the magnetic field components effected upon rotation of the pole wheel 102 of the common rotation sensor shown in FIG. 5 are considered.

Figure 7:
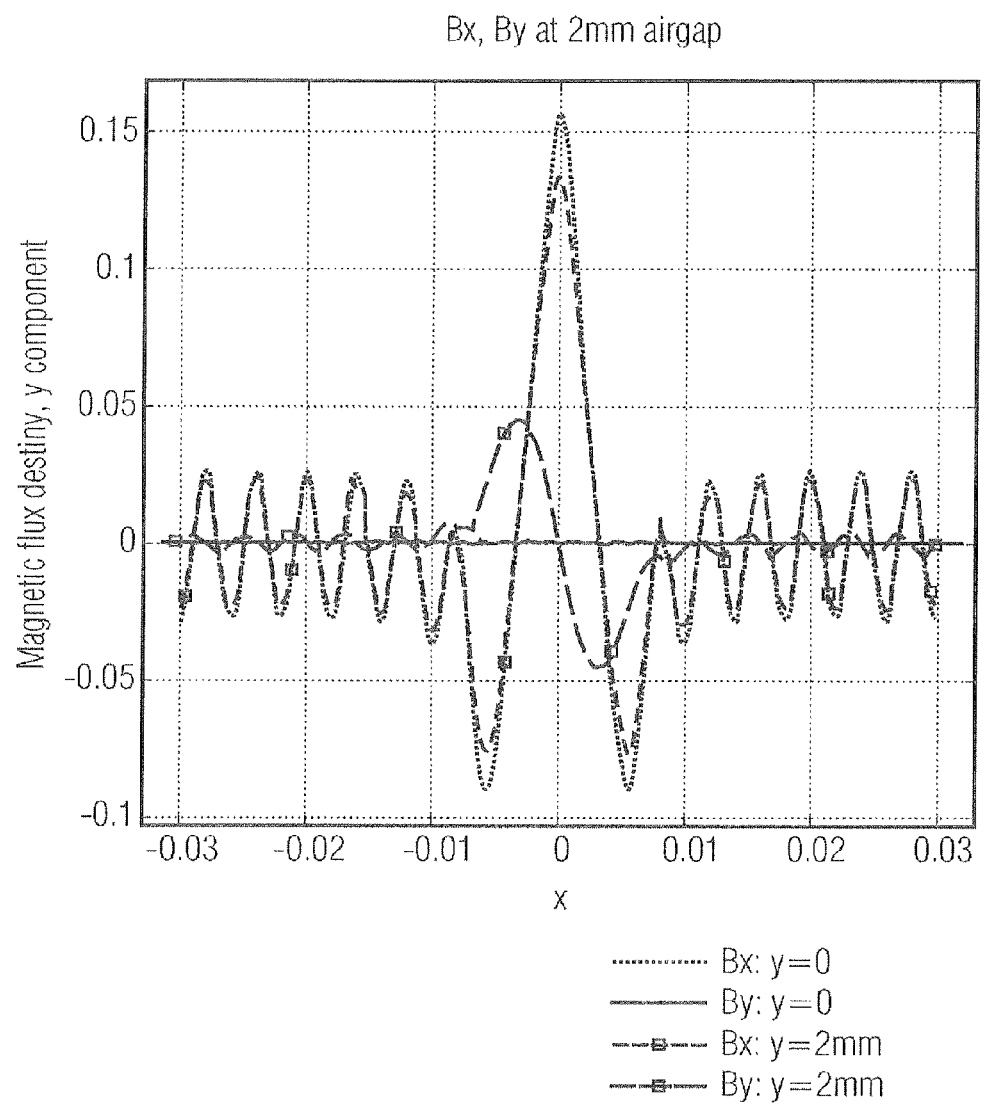
FIG. 7 shows a diagram of the x-component and the y-component of the magnetic field generated by the pole-wheel shown in FIG. 5.

FIG. 7 shows a diagram of the x-component and the y-component of the magnetic field generated by the pole-wheel 102 shown in FIG. 5. The ordinate describes the magnetic flux density, where the abscissa describes the x-axis of the reference coordinate system and hence the position of the pole-wheel 102 in the direction of rotation. Moreover, the x-component and the y-component of the magnetic field are plotted for a distance of 0 mm and for a distance of 2 mm from the pole-wheel in positive y-direction.

The pattern of the x-component of the magnetic field ($B_X$) is fine, whereas the y-component of the magnetic field ($B_Y$) vanishes only for the position y=0, and whereas it assumes positive and negative values for eccentric positions such as y=2 mm (which may happen in practice due to assembly tolerances).

This may lead to a negative y-component of the magnetic field ($B_Y<0$) on the XMR-sensors 104_1 to 104_3. More particularly, the y-component of the magnetic field ($B_Y$) is maximal while the x-component of the magnetic field ($B_X$) goes through zero. The x-component of the magnetic field ($B_X$) and the y-component of the magnetic field ($B_Y$) are 90° out of phase. If the magnitude of the y-component of the magnetic field ($B_Y$) is strong enough it may force the magnetization to point downwards (in negative y-direction). This may lead to the situation that the magnetization leaves the upper half-space (of the reference coordinate system)—in fact the tip of the magnetization (e.g. of the magnetization vector 130 shown in FIG. 6) may rotate on an ellipse while the pole-wheel 102 rotates.

In the following, the effect of a rotation of the magnetization of the free layer of the XMR-sensors 104_1 to 103_3 of the common rotation sensor shown in FIG. 5 is described.

Figure 8A:
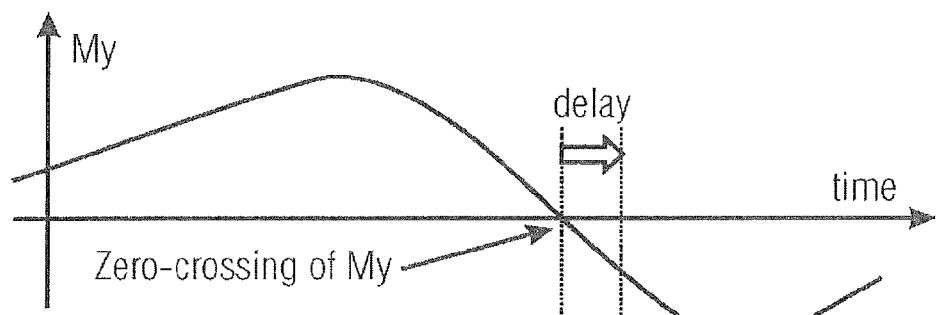
FIG. 8a shows a diagram of the y-component of the magnetization as a function of time.
Figure 8B:
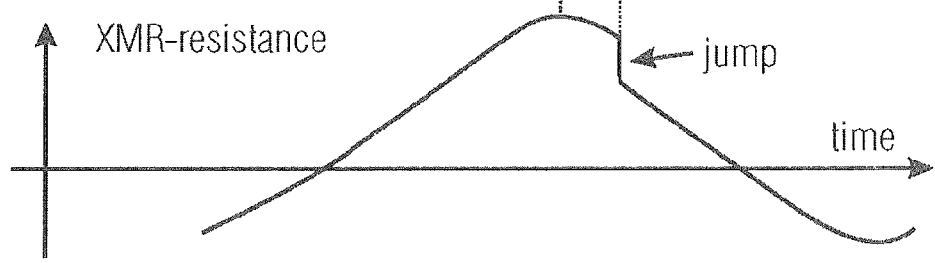
FIG. 8b shows a diagram of the XMR-resistance as a function of time.

FIG. 8a shows a diagram of the y-component of the magnetization ($M_Y$) as a function of time. Or in other words, FIG. 8a describes the rotation of the magnetization of the free layer of the XMR-sensors 104_1 to 104_3 effected upon rotation of the wheel 102. FIG. 8b shows a diagram of the XMR-resistance as a function of time.

As shown in FIGS. 8a and 8b, the XMR-resistance depends on the orientation of the magnetization. Moreover, it is observed experimentally that the XMR-resistance exhibits a discontinuous jump each time the sign of the y-component of the magnetization ($M_Y$) changes, or in other words, each time the magnetization vector 130 leaves the upper half-space of the reference coordinate system. Strictly speaking the jump in the XMR-resistance is delayed to the zero crossing of the y-component of the magnetization ($M_Y$).

Moreover, the XMR-sensors 104_1 to 104_3 shown in FIG. 5 can be GMR-sensors. Experimental results for that case are presented next.

Figure 9A:
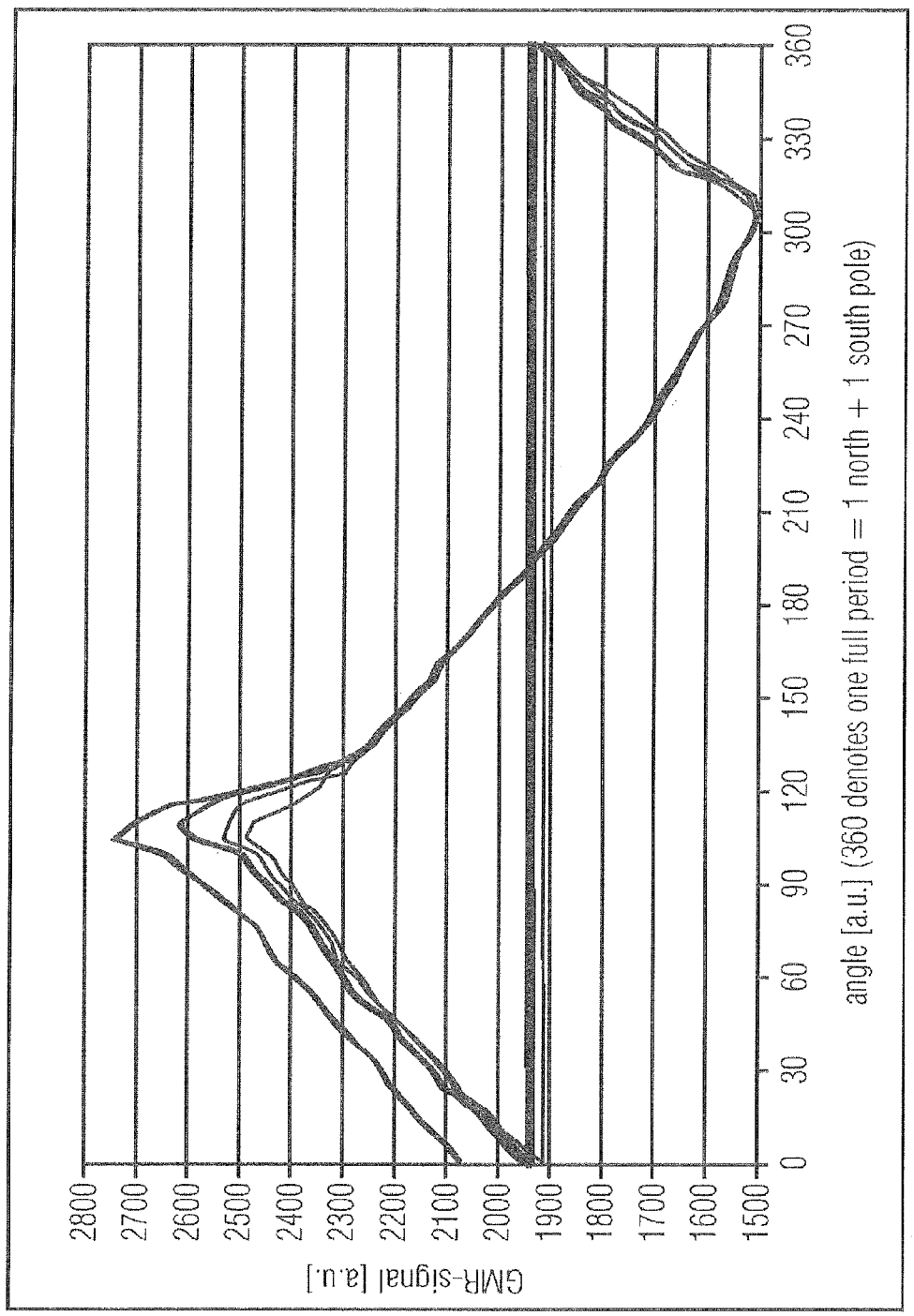
FIGS. 9a and 9b show diagrams of GMR-signals upon rotation of the wheel.
Figure 9B:
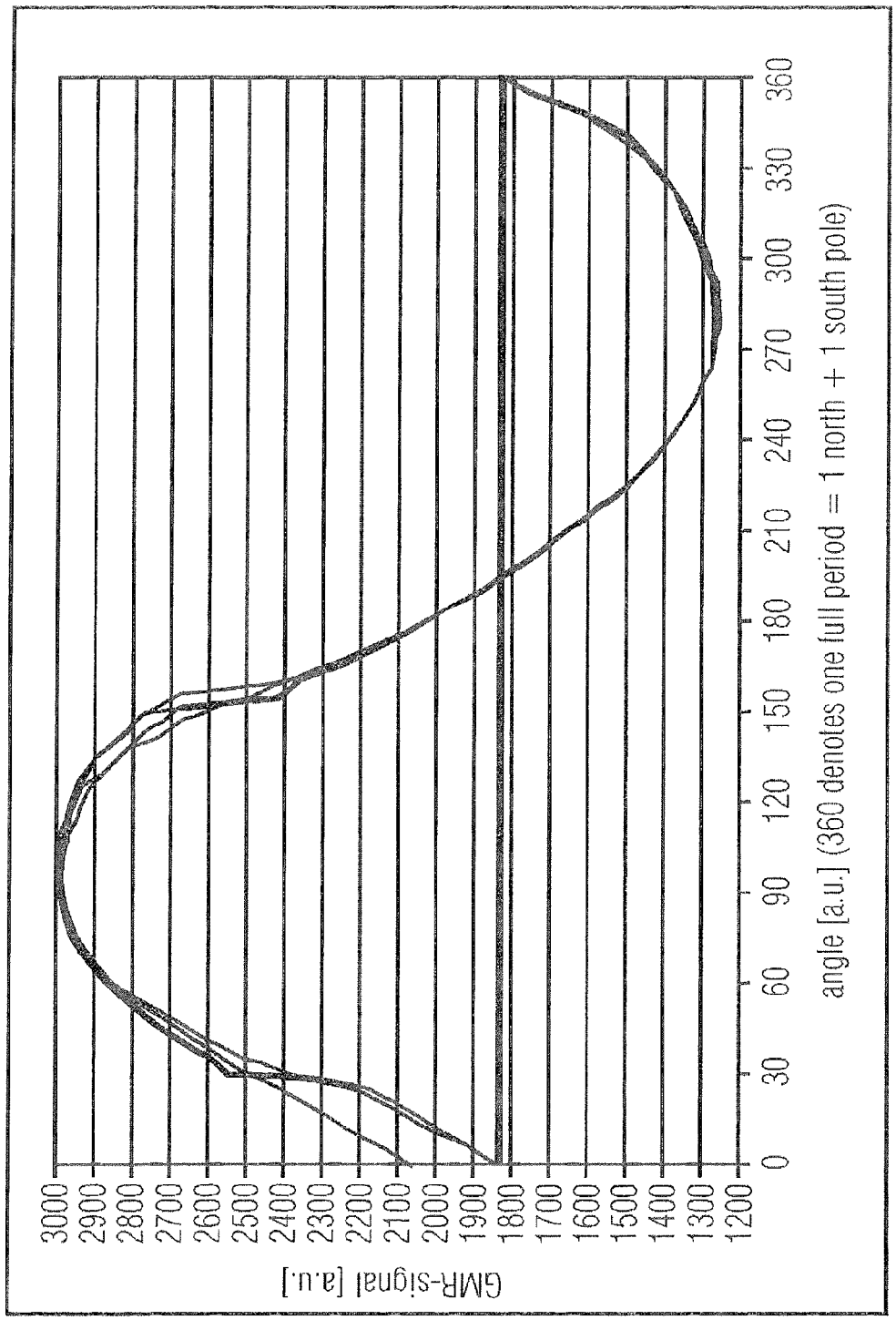

FIGS. 9a and 9b show diagrams of GMR-signals upon rotation of the wheel 102. The ordinate describes the magnitude of the GMR-signals. The abscissa describes the angle, where by definition an angle of 360° denotes one full period, or in other words, a rotation of the pole-wheel 102 shown in FIG. 5 by one north- and one south-pole. Moreover, four periods are copied onto one single diagram. The jump in the GMR-signals shown in FIGS. 9a and 9b are caused by a rotation of the magnetization of the free layer of the GMR-strip. This jump may lead to a malfunction of the GMR-sensor—therefore it should be avoided.

In the following, embodiments of the present invention that avoid jumps in the XMR-resistance are described exemplarily taking reference to a (rotation) sensor 100 comprising a wheel 102 and two XMR-sensors 104_1 and 104_2 similar to the (rotation) sensor 100 shown in FIGS. 3 and 4. Naturally, the following description is also applicable to a sensor comprising a body 102 and a magnetic field sensor as shown in FIGS. 1 and 2. For that reason, the curvature of the wheel 102 is neglected in the following FIG. 10.

In addition, the subsequent description relates exemplarily to (rotation) sensors 100 where the magnetic field sensors for detecting magnetic field components in the second and third direction are XMR-sensors. Of course, the subsequent description is also applicable to other types of magnetic field sensors that should be arranged such that a detection of a rotating magnetic field is avoided.

Figure 10:
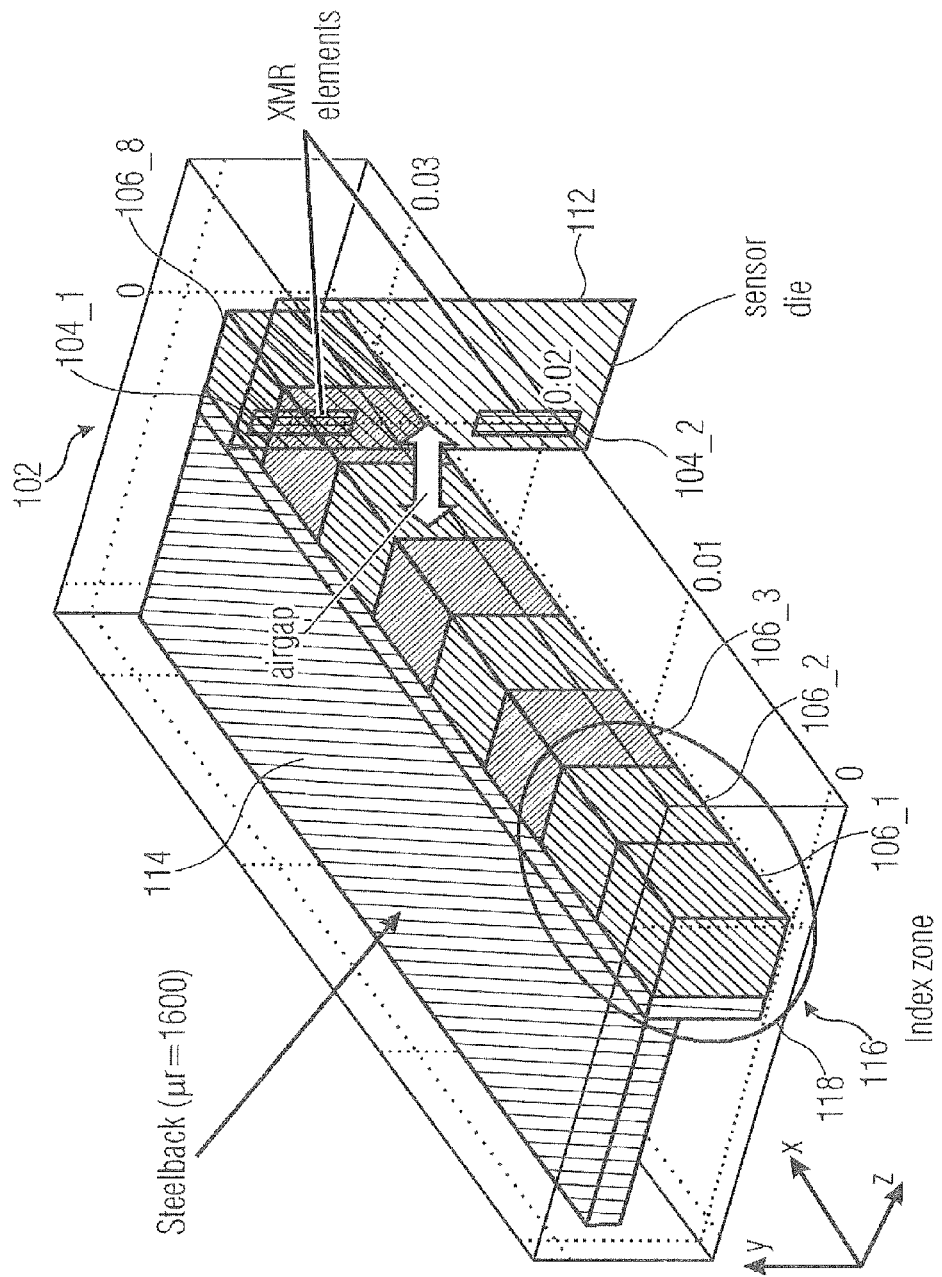
FIG. 10 shows an illustrative view of an embodiment of a (rotation) sensor with a wheel and a first XMR-Sensor and a second XMR-sensor.

FIG. 10 shows an illustrative view of an embodiment of a (rotation) sensor 100 with a wheel 102 and a first XMR-sensor 104_1 and a second XMR-sensor 104_2. The wheel comprises a plurality of azimuthally distributed structures 106_1 to 106_n to effect a periodically varying magnetic field upon rotation of the wheel 102. In FIG. 10, only a small portion of the wheel 102 is shown, namely the portion comprising the azimuthally distributed structures 106_1 to 106_8.

The first XMR-sensor 104_1 and the second XMR-sensor 104_2 are configured to detect components of the magnetic field in a second direction and in a third direction, wherein the first XMR-sensor 104_1 and the second XMR-sensor 104_2 are arranged adjacent to the wheel 102 such that the second direction corresponds to the y-axis of the reference coordinate system and such that the third direction corresponds to the z-axis of the reference coordinate system.

In other words, embodiments of the present invention show how to avoid the jump in the XMR-resistance by a modification of the pole-wheel (or arrangement of the pole-wheel with respect to the XMR-sensors 104_1 and 104_2). Moreover, the (rotation) sensor 100 does not require a special pole-wheel or bias magnets to prevent a rotation of the magnetization of the free layer of the XMR-sensors 104_1 and 104_2. By avoiding bias magnets, the magnetic sensitivity of the XMR-sensors 104_1 and 104_2 is enhanced, the (rotation) sensor 100 (or sensor module) is less expensive and requires less volume, and drifts of the magnet against the XMR-sensors 104_1 and 104_2 (over temperature and lifetime) and problems with assembly tolerances are avoided. By avoiding special pole-wheels, the (rotation) sensor 100 is less expensive and less complicated to handle for a customer.

In embodiments of the present invention, the jump in the XMR-resistance is avoided due to the arrangement of the XMR-sensors 104_1 and 104_2 with respect to the magnetic field generated by the wheel 102. The arrangement of the XMR-sensors 104_1 and 104_2 prevents a rotational magnetic field. As already described above, it is observed that the x-component of the magnetic field ($B_X$) is 90° out of phase to the y-component of the magnetic field ($B_Y$). Also the x-component of the magnetic field ($B_X$) is 90° out of phase to the z-component of the magnetic field ($B_Z$). Therefore, the y-component of the magnetic field ($B_Y$) and the z-component of the magnetic field ($B_Z$) are in phase. Hence, the sensor die 112 is arranged in such a way that the die surface (=relevant XMR plane) is parallel to the y-z-plane of the reference coordinate system. Now the x-component of the magnetic field ($B_X$) is perpendicular to the sensor die 112 and therefore it is irrelevant to the XMR-sensors 104_1 and 104_2. In practice there will be a small x-component of the magnetic field ($B_X$) coupled onto the XMR-sensors 104_1 and 104_2 due to tilts and misalignments between the sensor die 112 and the target wheel 102, however, if the x-component is small it does not matter. The two relevant magnetic field components are the y-component ($B_Y$) and the z-component ($B_Z$). They are both in phase so that the field applied to the XMR-sensors 104_1 and 104_2 does not rotate and therefore the magnetization of the XMR-sensors 104_1 and 104_2 does not jump between the two half spaces (of the reference coordinate system).

The z-component of the magnetic field ($B_Z$) is strongest at the center of the wheel 102 (at y=0) and decreases moderately versus y. The y-component of the magnetic field ($B_Y$) vanishes for y=0 and increases linearly with y until the edge of the wheel 102. Therefore, the XMR-sensors 104_1 and 104_2 may be placed at a position greater or smaller than zero (y<>0) as shown in FIG. 10.

Moreover, in FIG. 10 exemplary regions where the XMR-sensors 104_1 and 104_2 might be placed are shown, yet it does not mean that the XMR-sensors 104_1 and 104_2 have to be elongated strips along the y-direction. They can also be composed of several strips along the z-direction or of meanders, spirals, O-shapes or L-shapes etc. In some embodiments, the XMR-sensors 104_1 and 104_2 may be placed close to the edge of the die 112 which is nearest to (or adjacent to) the target wheel 102.

Figure 11:
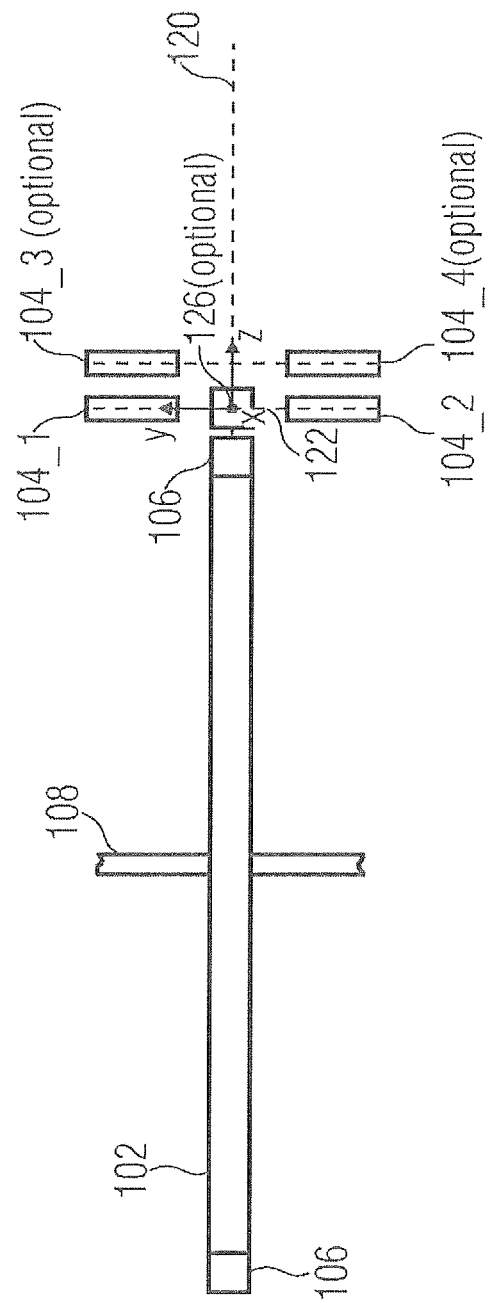
FIG. 11 shows an illustrative side-view of the (rotation) sensor shown in FIG. 10.

FIG. 11 shows an illustrative side-view of the (rotation) sensor 100 shown in FIG. 10. The wheel 102 can be arranged to define a plane 120 that is perpendicular to the axis 108 of the wheel 102, wherein the first XMR-sensor 104_1 is arranged on a first side of the plane 120 (positive y-direction) at a defined distance to the plane 120, and wherein the second XMR-sensor 104_2 is arranged on a second side of the plane 120 (negative y-direction) in a defined distance to the plane 120.

In some embodiments, the first XMR-sensor 104_1 and the second XMR-sensor 104_2 can be arranged on a surface normal 122 of the plane 120 of the wheel 102. Thereby, the first XMR-sensor 104_1 and the second XMR-sensor 104_2 might be arranged at a same distance to the wheel 102.

For GMRs, CMRs and TMRs (not for AMRs) it is important in which direction the pre-magnetization (of the fixed or pinned layer) is defined. This should be in the positive or negative y direction for both XMR-sensors 104_1 and 104_2. With this arrangement the upper XMR-sensor 104_1 (at y>0) has a y-component of the magnetic field ($B_Y$) and thus a resistance excursion with opposite direction to the lower XMR-sensor 104_2 (at y<0). Both XMR-sensors 104_1 and 104_2 may constitute a half bridge and the difference of both might be evaluated by a circuit. In this way a differential field measurement might be achieved that is robust against background magnetic fields (disturbances). Moreover, a second half-bridge might be implemented (where the XMR-sensors are at the same spots as shown in FIG. 10, yet exchanged with one another) and both half bridges may be combined to form a full Wheatstone-bridge circuit as it is common in sensor circuits.

Or in other words, the first XMR-sensor 104_1 and the second XMR-sensor 104_2 can comprise a pinned layer, wherein the pinned layers of the first XMR-sensor 104_1 and the second XMR-sensor 104_2 are premagnetized in the same direction. The pinned layers of both XMR-sensors 104_1 and 104_2 might be premagnetized, for example, in the positive y-direction, in the negative y-direction, in the positive z-direction or in the negative z-direction. The evaluator might be configured to detect an XMR-signal that depends on a resistance of the first XMR-sensor 104_1 or of the second XMR-sensor 104_2, and to evaluate a position, velocity, or acceleration of the wheel 102 based on the detected XMR-signal. Moreover, the evaluator may comprise an evaluation circuit configured to reduce an effect of a background magnetic field. To reduce the effect of a background magnetic field, the evaluation circuit may comprise the resistance of the first XMR-sensor 104_1 and the resistance of the second XMR-sensor 104_2 connected to a half bridge.

The (rotation) sensor 100 shown in FIG. 11 might optionally comprise a third XMR-sensor 104_3 and a fourth XMR-sensor 104_4 configured to detect components of the magnetic field in a second and in a third direction, wherein the third XMR-sensor 104_3 and the fourth XMR-sensor 104_4 are arranged adjacent to the wheel 102 such that the second direction corresponds to the y-axis of the reference coordinate system and such that the third direction corresponds to the z-axis of the reference coordinate system. The pinned layers of the third XMR-sensor 104_3 and of the fourth XMR-sensor 104_4 might be premagnetized in the same direction. Moreover, the pinned layers of the third and fourth XMR-sensors 104_3 and 104_4 might be premagnetized in the same or opposite direction as the pinned layers of the first and second XMR-sensors 104_1 and 104_2.

As shown in FIG. 11, the first and the third XMR-sensors 104_1 and 104_3 might be arranged on a first side of the plane 120 (positive y-direction) in a defined distance to the plane 120, wherein the second and the fourth XMR-sensors 104_2 and 104_4 might be arranged on a second side of the plane 120 in a defined distance to the plane 120. Moreover, the evaluation circuit might comprise the resistances of the first, the second, the third and the fourth XMR-sensors 104_1 to 104_4 connected to a Wheatstone-bridge.

In the following, the functionality of the (rotation) sensor 100 with two XMR-sensors 104_1 and 104_2 shown in FIGS. 10 and 11 is described (FIG. 11 without the optional third and fourth XMR-sensors 104_3 and 104_4). Naturally, the following description is also applicable to a (rotation) sensor 100 with four XMR-sensors 104_1 to 104_4.

In some embodiments, the z-component of the magnetic field ($B_Z$) is still important for the XMR-sensors 104_1 and 104_2. It adds up to the anisotropy-field of the XMR-sensors 104_1 and 104_2 (like e.g. shape anisotropy). When the z-component of the magnetic field ($B_Z$) has a large magnitude (independent of its sign), the magnetic sensitivity of the XMR-sensors 104_1 and 104_2 with respect to the y-component of the magnetic field ($B_Y$) is reduced. Since both are in phase this does not matter. The z-component of the magnetic field ($B_Z$) is large when the y-component of the magnetic field ($B_Y$) is large and thus the z-component of the magnetic field ($B_Z$) does not affect the important zero crossings of the signals of the XMR-sensors 104_1 and 104_2 (XMR-signals). The z-component ($B_Z$) and the y-component ($B_Y$) of the magnetic field may exhibit the same life-time drift or temperature-drift or process spread or drift over air-gap and also x-dependence. Or in other words, the z-component ($B_Z$) and the y-component ($B_Y$) of the magnetic field are perfect twins. At a large air-gap the y-component of the magnetic field ($B_Y$) gets small and fortunately also the z-component of the magnetic field ($B_Z$) gets small. Therefore, the z-component of the magnetic field ($B_Z$) does not reduce the magnetic sensitivity of the system (rotation sensor 100) at large air-gaps. In fact the z-component of the magnetic field ($B_Z$) has even a beneficial effect. It is a kind of negative feed-back, which prevents the XMR-sensors 104_1 and 104_2 from getting saturated at small air-gaps or with strong magnets.

The orientation of the sensor die 112 towards the target wheel has both advantages and disadvantages. The advantage is that for leaded packages like the PG-SSO-package line from Infineon Technologies® the customer does not have to bend the leads any more, which saves costs and space. Another advantage is that the sensor layout does not need to match the pitch of the target wheel 102. If the poles 106_1 to 106_8 of the wheel 102 are only 3 mm long in the x-direction or 10 mm long in the x-direction, it does not matter—the XMR-sensors 104_1 and 104_2 always deliver a zero-crossing of the signal (XMR-signal) at each border of alternating poles 106_1 to 106_8. The disadvantage of course is an increased distance of the XMR-sensors 104_1 and 104_2 to the target wheel 102, because the semiconductor die 112 still has to be covered by parts of the package (not shown in FIG. 10). Yet this is not a serious drawback, because of the high magnetic sensitivity of the XMR-sensors 104_1 and 104_2. Another disadvantage is that it is more complicated to implement a reference or index zone 118 and it is also not possible to detect the direction of rotation of the wheel 102 with the XMR-sensors 104_1 and 104_2 shown so far. However, this can be greatly improved by adding an optional Hall-sensor 126, for example, in the center between lower and upper XMR-sensors 104_1 and 104_2. The Hall-sensor 126 detects the x-component of the magnetic field ($B_X$), which is the strongest and therefore makes up for part of the smaller magnetic sensitivity of the Hall-sensor 126. Besides, the z-component of the magnetic field ($B_Z$) is 90° out of phase with the x-component ($B_X$) and the y-component ($B_Y$) of the magnetic field, so that it is possible to defer the direction of rotation of the wheel 102 by comparing the XMR-signals with the Hall-signals.

Or in other words, the (rotation) sensor may comprise a Hall-sensor 126 arranged adjacent to the wheel between the first XMR-sensor 104_1 and the second XMR-sensor 104_2, wherein the Hall-sensor 126 may be configured to detect a component of the magnetic field in a first direction, and wherein the first direction is perpendicular to the second direction and to the third direction. The evaluator may be further configured to detect a Hall-signal of the Hall-sensor 126 and to evaluate a direction of rotation of the wheel based on the detected Hall-signal.

Figure 12:
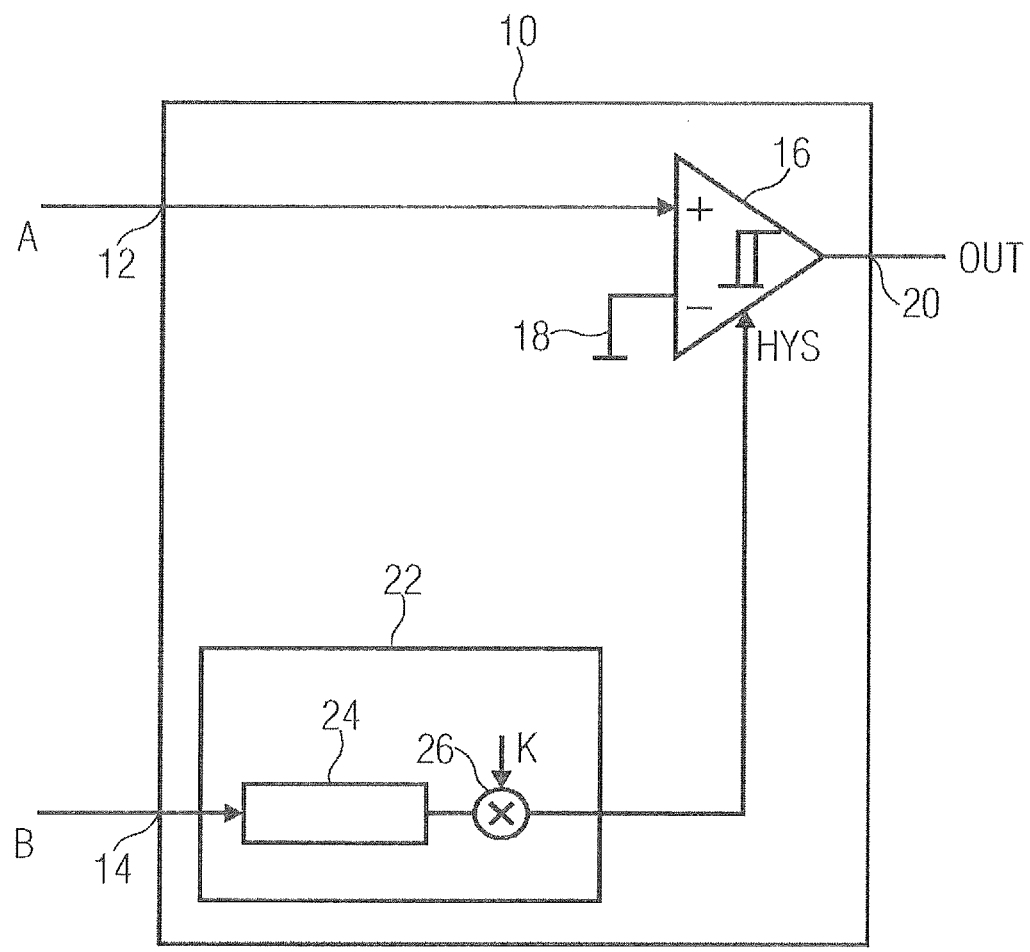
FIG. 12 shows a device for comparing an XMR-signal with a Hall-signal.

FIG. 12 shows a device for comparing an XMR-signal with a Hall-signal. The device has inputs 12 and 14 for receiving two input signals based on a parameter to be detected, an output for an output signal, a device for switching the output signal to a first logic level if the first input signal A at input 12 exceeds a threshold greater than the defined value 18 and to a second logic level if it falls below a second threshold lower than the defined value 18 and a device 22 for adjusting the thresholds using the second input signal B at input 14. The device has inputs 12 and 14 for receiving first and second input signals A and B based on a parameter to be detected, whereby the second input signal B is greater than the first if the first input signal A has a defined value, an output 20 for a first output signal OUT, a device 16 for switching the output signal to a first logic level if the first input signal A exceeds a threshold greater than the defined value 18 and to a second logic level if it falls below a second threshold lower than the defined value 18 and a device 22 for adjusting the thresholds using the level of the second input signal.

Moreover, the direction signal of the Hall-sensor 126 is not as critical for the correct performance of the system (or (rotation) sensor 100) than the speed signal of the XMR-sensors 104_1 and 104_2. The speed signal needs to be of higher quality in order to get low jitter and accurate switching levels, whereas only the sign of the direction signal at the moment when the speed signal crosses zero from positive or negative values, or vice versa, is necessary to derive the direction of rotation. Note also that the Hall-sensor can be used to measure the exact magnitude of the field, which is necessary for true-power-on function (which determines if a north- or a south-pole is closest to the sensor directly after power-on of the system). Another advantage of this system is that with Hall- and XMR-sensors it is possible to implement a speed sensor with direction detection, which is independent of the pitch of the target wheel 102. The Hall-sensor 126 has the additional advantage to be able to detect conventional reference/index zones 118. In summary, the (rotation) sensor 100 according to the concept of the present invention has several advantages which can be combined in an attractive way.

In practice the z-component of the magnetic field ($B_Z$) is stronger than the y-component of the magnetic field ($B_Y$) for most common geometries of target wheels. This, however, is not a problem because of the high sensitivity of the XMR-sensors 104_1 and 104_2, as will become clear from the following description.

Next, the high sensitivity of XMR-sensors is demonstrated by means of an embodiment of a (rotation) sensor 100 comprising four GMR-sensors 104_1 to 104_4. The four GMR-sensors 104_1 to 104_4 might be arranged as described in FIG. 11, where the resistances of the GMR-sensors 104_1 to 104_4 are connected to a Wheatstone bridge. Naturally, the following description is also applicable in general to XMR-sensors.

Figure 13:
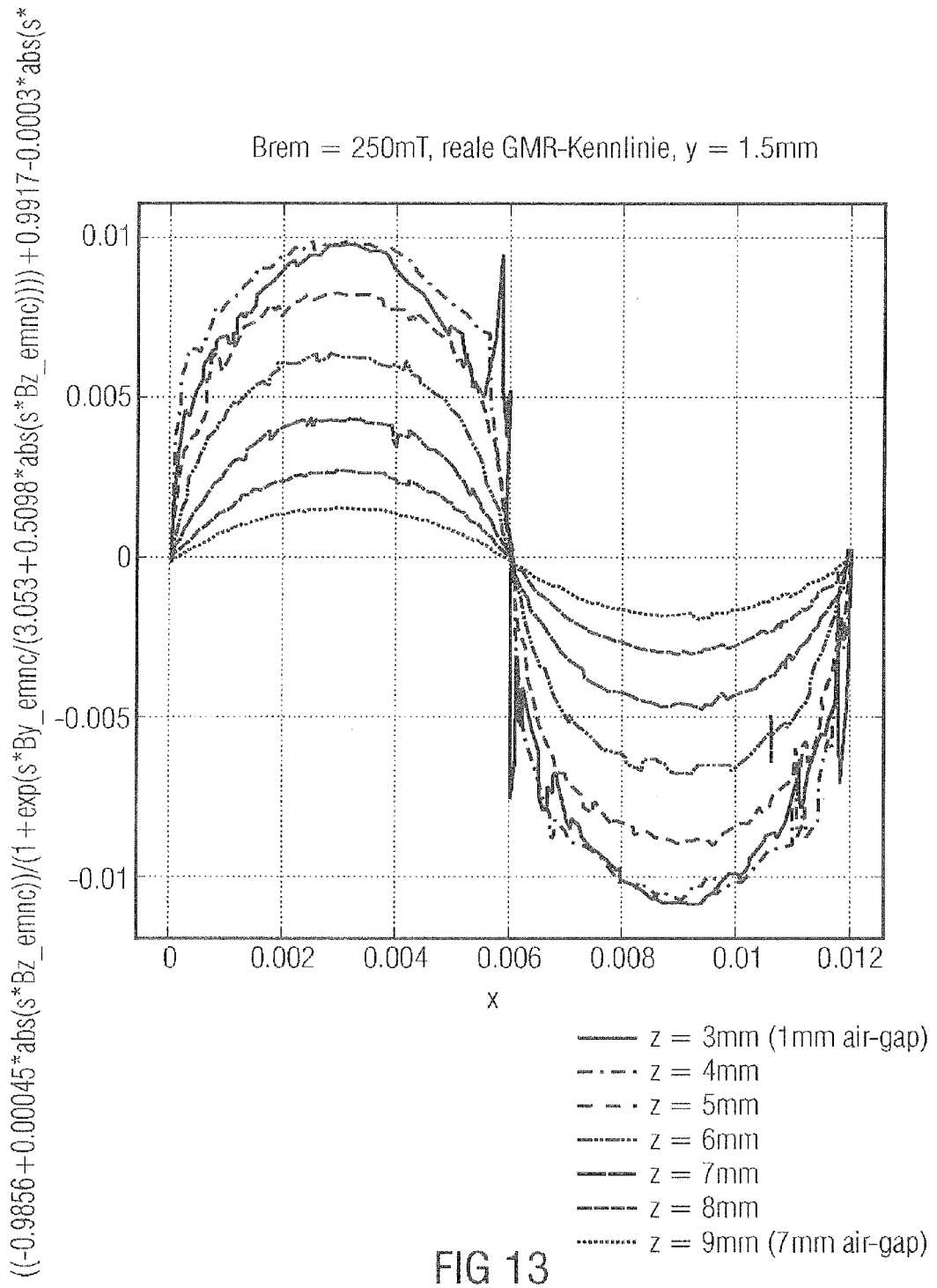
FIG. 13 shows the output voltage of a Wheatstone bridge of a (rotation) sensor with four GMR-sensors.

FIG. 13 shows the output voltage of a Wheatstone bridge of a (rotation) sensor 100 with four GMR-sensors 104_1 to 104_4. The ordinate describes the output voltage in volt [V], where the abscissa describes the x-axis of the reference coordinate system and hence the position of the pole-wheel 102 in the direction of rotation in millimeters [mm]. The Wheatstone bridge is exemplarily supplied by a supply voltage of 1 V. In FIG. 13, magnetic domains of 6 mm×6 mm×1 mm located between z=1 mm and z=2 mm and a remanence of 250 mT were assumed.

As shown in FIG. 13, even at a 7 mm air-gap the amplitude of the GMR-sensor is more than 1 mV (without additional amplifiers), which is easily processed by signal conditioning circuits. Furthermore, the curves are close to sinusoidal even at small air-gaps. The GMR-sensors 104_1 to 104_4 do not saturate due to negative feedback from the z-component of the magnetic field ($B_Z$) as explained above.

In some embodiments, it does not matter if the entire sensor is shifted in the y-direction by assembly tolerances. The y-component of the magnetic field on the lower XMR-sensors 104_2 and 104_4 is reduced while the y-component on the upper XMR-sensors 104_1 and 104_3 is increased, or vice-versa. Therefore the total signal, which is the difference of both, remains unchanged.

In the following, the magnetic field generated by an exemplarily pole-wheel 102 is described in detail.

Figure 14:
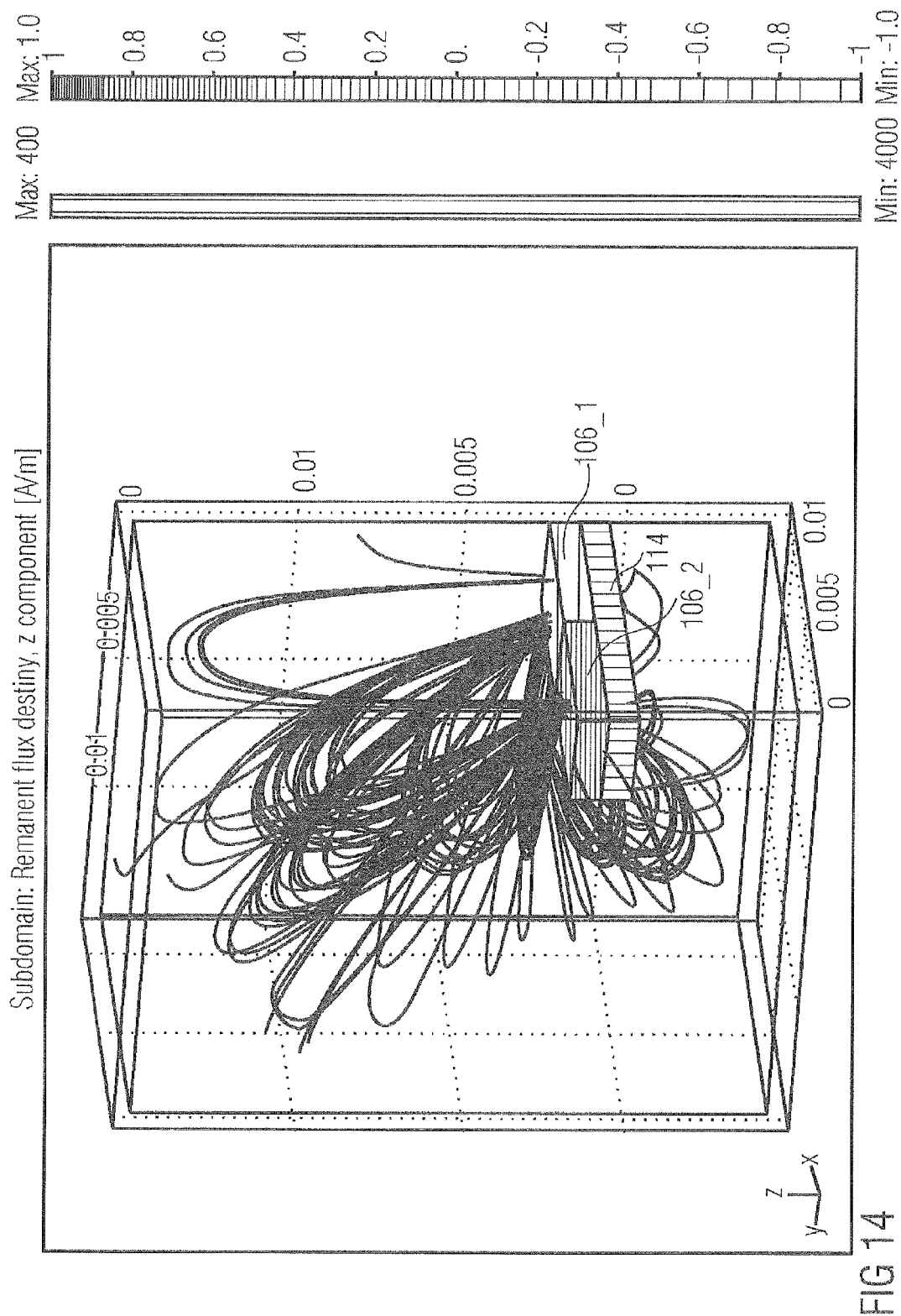
FIG. 14 shows a small portion of a pole-wheel and fluxlines of a magnetic field generated by the small portion of the pole-wheel.

FIG. 14 shows a small portion of a pole-wheel 102 and fluxlines of a magnetic field generated by the small portion of the pole-wheel 102. The small portion of the pole-wheel 102 comprises two magnets or magnetic poles 106_1 and 106_2. The steel-back 114 has a thickness of, for example, 1 mm (from z=0 to z=1 mm) and a relative permeability of, for example, 4000. The magnets 106_1 and 106_2 are magnetized with a remanence of, for example, 1 T in the positive (magnet 106_2) and negative (magnet 106_1) z-direction. The entire geometry is assumed to be mirror symmetric to y=0.

Figure 15:
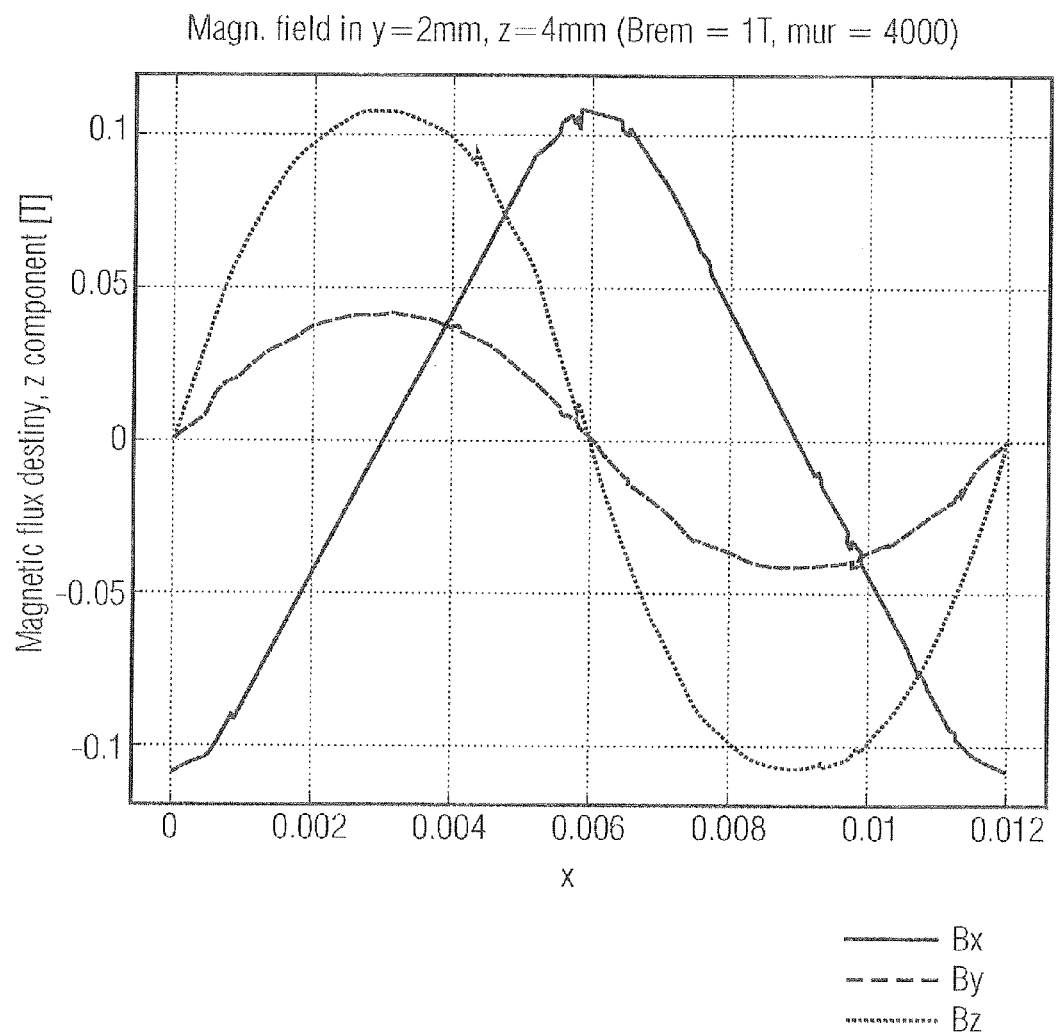
FIG. 15 shows the x-component, the y-component and the z-component of the magnetic field generated by the small portion of the pole-wheel shown in FIG. 14.

FIG. 15 shows the x-component, the y-component and the z-component of the magnetic field generated by the small portion of the pole-wheel 102 shown in FIG. 14. The ordinate describes the magnetic flux density in Tesla [T], where the abscissa describes the x-axis of the reference coordinate system in millimeters [mm].

Figure 16:
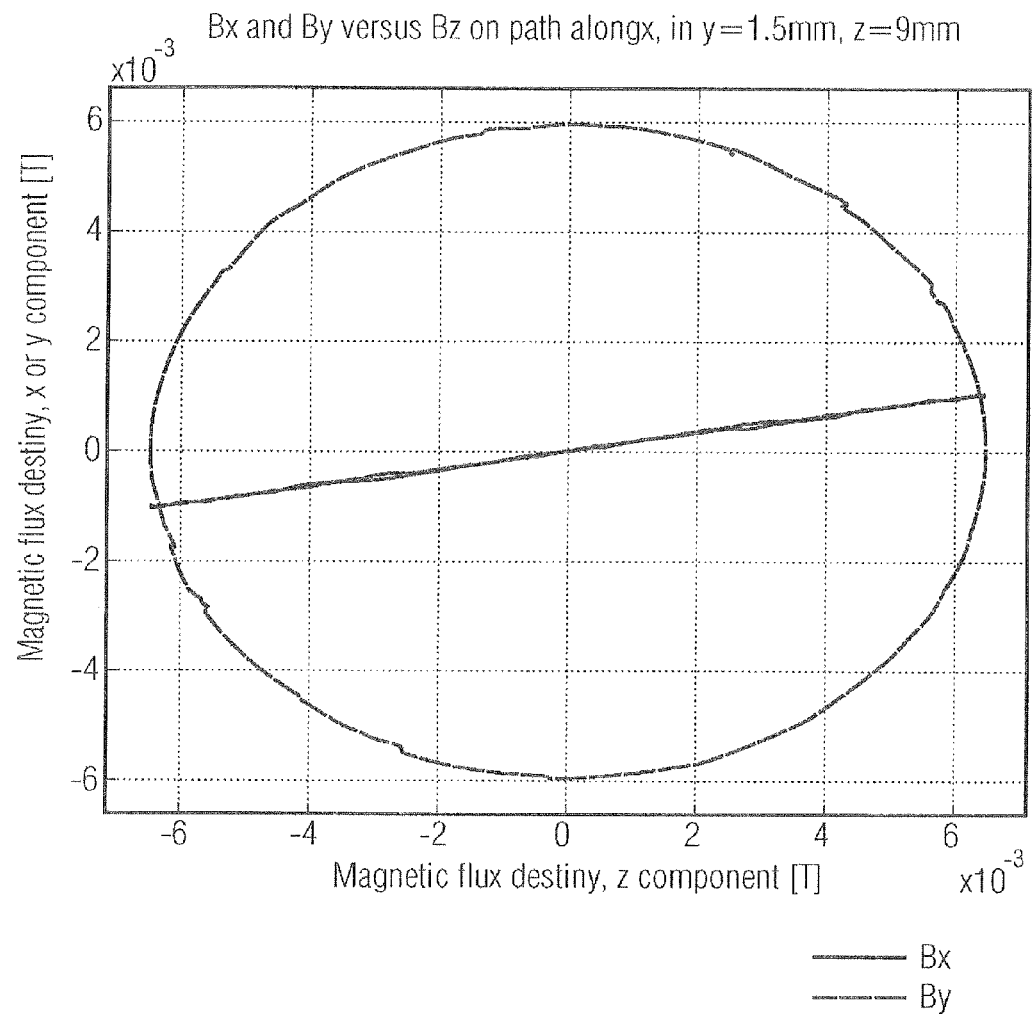
FIG. 16 shows the x-component of the magnetic field versus the z-component of the magnetic field and the y-component of the magnetic field versus the z-component of the magnetic field on a path along the x-direction.

FIG. 16 shows the x-component of the magnetic field ($B_X$) versus the z-component of the magnetic field ($B_Z$) and the y-component of the magnetic field ($B_Y$) versus the z-component of the magnetic field ($B_Z$) on a path along the x-direction (in y=1.5 mm and z=9 mm). The ordinate describes the x-component and the y-component of the magnetic flux density in Tesla [T], where the abscissa describes the z-component of the magnetic flux density in Tesla [T]. FIG. 16 shows an ellipse for the x-component of the magnetic field ($B_X$) versus the z-component of the magnetic field ($B_Z$) and a straight line for the y-component of the magnetic field ($B_Y$) versus the z-component of the magnetic field ($B_Z$). In the y-z-plane the field reciprocates only, whereas in the x-z-plane it rotates. In addition, the amplitude of the y-component of the magnetic flux density ($B_Y$) is smaller (only 1 mT) compared to the x-component of the magnetic flux density ($B_X$) (6 mT) at the large air-gap. Hence, the magnetic sensitivity is reduced by a factor of 6 (and there is still some additional reduction due to the larger air-gap).

Figure 17:
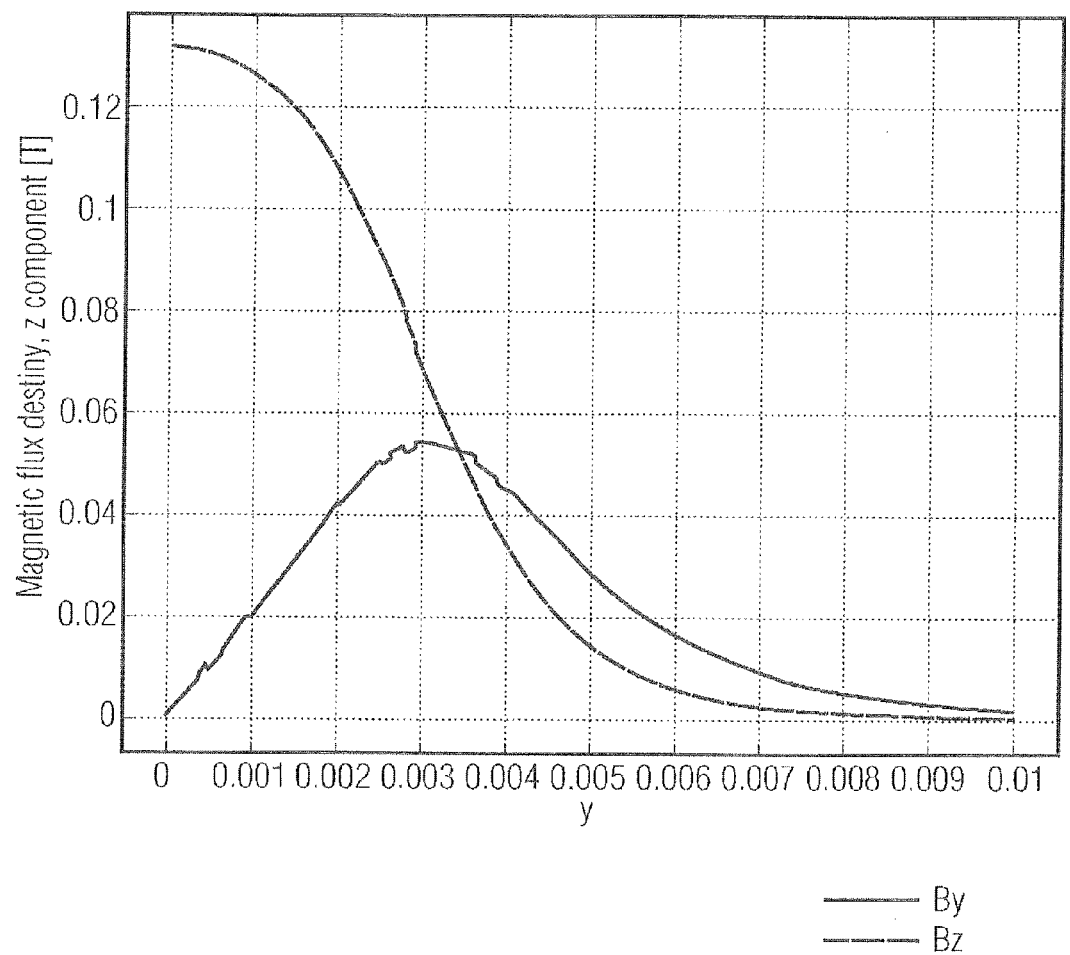
FIG. 17 shows the y-component and the z-component of the magnetic flux density at a small air-gap as a function of the y-component of the reference coordinate system.

FIG. 17 shows the y-component ($B_Y$) and the z-component ($B_Z$) of the magnetic flux density at a small air-gap (z=3 mm and x=3 mm) as a function of the y-component of the reference coordinate system. The ordinate describes the magnetic flux density in Tesla [T], where the abscissa describes the y-axis of the reference coordinate system in millimeters [mm]. The z-component of the magnetic flux density ($B_Z$) is stronger than the y-component of the magnetic flux density ($B_Y$). Moreover, the y-component of the magnetic flux density ($B_Y$) is linear to the y offset from the center line.

Figure 18:
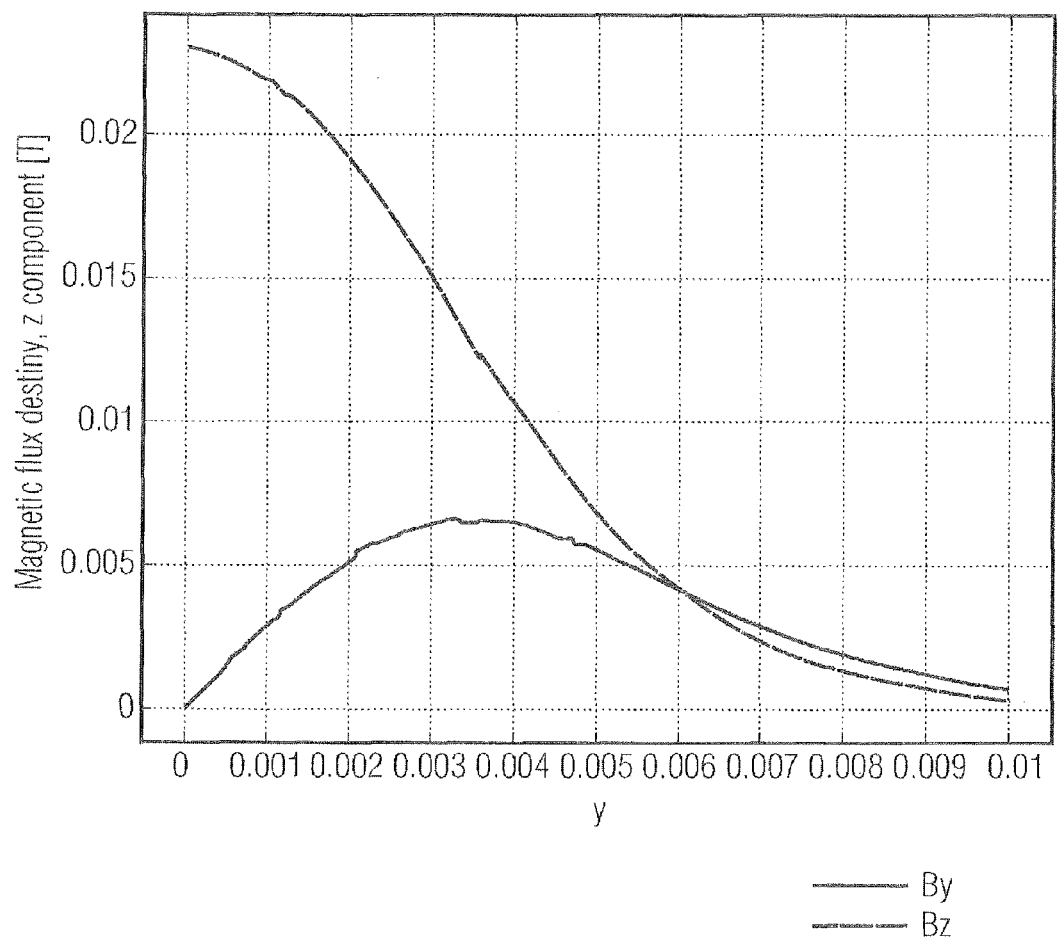
FIG. 18 shows the y-component and the z-component of the magnetic flux density at a large air-gap as a function of the y-component of the reference coordinate system.

FIG. 18 shows the y-component ($B_Y$) and the z-component ($B_Z$) of the magnetic flux density at a large air-gap (z=7 mm and x=3 mm) as a function of the y-component of the reference coordinate system. The ordinate describes the magnetic flux density in Tesla [T], where the abscissa describes the y-axis of the reference coordinate system in millimeters [mm]. Moreover, the y-component of the magnetic flux density ($B_Y$) is linear to the y offset from the center line.

Embodiments of the present invention provide a magnetic sensor, which is placed with the normal of the die surface in tangential direction of the target wheel, with XMR-sensor elements near the edge close to the wheel and offset to the center plane (defined by) y=0. If the XMR-sensor elements are GMR-sensor elements then the pinned layer may be magnetized in parallel to the positive/negative y-direction. The magnetic sensor comprises at least two XMR-sensors at different y-locations and outputs are subtracted for differential field measurement. Additionally, the magnetic sensor may comprise a Hall-sensor near to the edge close to the wheel and preferably in the center between XMR elements used to detect true-power-on position, direction of rotation of wheel, and the index zone of the target wheel.

Further embodiments of the present invention provide a method for measuring a movement of a body, wherein the body comprises a plurality of structures arranged in a first direction to effect a periodically varying magnetic field upon movement of the body in the first direction. The method comprises detecting components of the magnetic field in a second direction and in a third direction with an XMR-sensor, wherein the XMR-sensor is arranged adjacent to the body such that the second direction is perpendicular to the first direction and such that the third direction is perpendicular to the first direction and to the second direction.

In some embodiments, the method for measuring a movement of a body may further comprise two additional steps. In one step, an XMR-signal that depends on a resistance of the XMR-sensor is detected. In another step, a position, velocity or acceleration of the body is evaluated based on the detected XMR-signal.

In some embodiments, the method for measuring a movement of a body may further comprise detecting a component of the magnetic field in the first direction with a Hall-sensor, wherein the Hall-sensor is arranged adjacent to the body.

Further embodiments of the present invention provide a method for measuring a rotation of a wheel, wherein the wheel comprises a plurality of azimuthally distributed structures to effect a periodically varying magnetic field upon rotation of the wheel. The method comprises detecting components of the magnetic field in a second direction and in a third direction with an XMR-sensor, wherein the XMR-sensor is arranged adjacent to the wheel such that the second direction corresponds to a direction of the axis of the wheel and the third direction corresponds to a radial direction of the wheel.

In some embodiments, the method for measuring a rotation of a wheel may further comprise two additional steps. In one step, an XMR-signal that depends on a resistance of the XMR-sensor is detected. In another step, a position, velocity or acceleration of the wheel is evaluated based on the detected XMR-signal.

In some embodiments, the method for measuring a rotation of a wheel may further comprise detecting a component of the magnetic field in a first direction with a Hall-sensor, wherein the first direction is perpendicular to the second direction and to the third direction.

Embodiments of the present invention further provide a method for manufacturing a sensor. In a first step, a body with a plurality of structures arranged in a first direction to effect a periodically varying magnetic field upon movement of the body in the first direction is provided. In a second step, an XMR-sensor configured to detect components of the magnetic field in a second direction and in a third direction is provided, wherein the XMR-sensor is arranged adjacent to the wheel such that the second direction is perpendicular to the first direction and such that the third direction is perpendicular to the first direction and to the second direction.

In some embodiments, the method for manufacturing a sensor may further comprise providing an evaluator configured to detect an XMR-signal that depends on a resistance of the XMR-sensor and to evaluate a position, velocity, or acceleration of the body based on the detected XMR-signal.

In some embodiments, the method for manufacturing a sensor may further comprise providing a Hall-sensor to detect a component of the magnetic field in the first direction, wherein the Hall-sensor is arranged adjacent to the wheel.

Embodiments of the present invention further provide a method for manufacturing a (rotation) sensor. In a first step, a wheel with a plurality of azimuthally distributed structures to effect a periodically varying magnetic field upon rotation of the wheel is provided. In a second step, an XMR-sensor configured to detect components of the magnetic field in a second direction and in a third direction is provided, wherein the XMR-sensor is arranged adjacent to the wheel such that the second direction corresponds to a direction of the axis of the wheel and the third direction corresponds to a radial direction of the wheel.

In some embodiments, the method for manufacturing a (rotation) sensor may further comprise providing an evaluator configured to detect an XMR-signal that depends on a resistance of the XMR-sensor and to evaluate a position, velocity, or acceleration of the wheel based on the detected XMR-signal.

In some embodiments, the method for manufacturing a (rotation) sensor may further comprise providing a Hall-sensor to detect a component of the magnetic field in a first direction; wherein the Hall-sensor is arranged adjacent to the wheel such that the first direction is perpendicular to the second direction and to the third direction.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block, item or feature of a corresponding apparatus. Some or all of the method steps may be executed by (or using) a hardware apparatus, for example, a microprocessor, a programmable computer or an electronic circuit. In some embodiments, one or more of the most important method steps may be executed by such an apparatus.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment comprises a processing means, for example a computer or a programmable logic device, configured to, or adapted to, perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, afield programmable gate array may cooperate with a microprocessor in order to perform one of the methods described herein. Generally, the methods can be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A sensor, comprising:
a body with a plurality of structures arranged in a first direction configured to effect a periodically varying magnetic field in a second direction and a third direction upon movement of the body in the first direction;
a magnetic field sensor configured to detect components of the magnetic field in the second direction and in the third direction;
wherein the magnetic field sensor is arranged adjacent to the body such that the second direction is perpendicular to the first direction and such that the third direction is perpendicular to the first direction and to the second direction; and
wherein the plurality of structures of the body comprise magnetic poles arranged with alternating polarity.

2. The sensor according to claim 1, wherein the magnetic field sensor comprises a magneto resistive sensor.

3. The sensor according to claim 2, wherein the magneto resistive sensor comprises an anisotropic magneto resistive sensor, a giant magneto resistive sensor, a tunnel magneto resistive sensor or a colossal magneto resistive sensor.

4. The sensor according to claim 1, further comprising an evaluator configured to detect a sensor signal of the magnetic field sensor and evaluate a position, velocity, or acceleration of the body based on the detected sensor-signal.

5. The sensor according to claim 1, further comprising an additional magnetic field sensor arranged adjacent to the body and configured to detect a component of the magnetic field in the first direction.

6. The sensor according to claim 5, wherein the additional magnetic field sensor comprises a Hall-sensor.

7. The sensor according to claim 5, further comprising an evaluator configured to detect a sensor signal of the magnetic field sensor and detect an additional sensor signal of the additional magnetic field sensor, and evaluate a position, velocity, or acceleration of the body based on the detected sensor signal and evaluate a direction of movement of the body based on the detected additional sensor signal.

8. The sensor according to claim 1, wherein the components of the magnetic field in the second direction and the third direction periodically pass through zero.

9. The sensor according to claim 1, wherein the magnetic field sensor is arranged such that a rotation of the magnetization of a free layer of the magnetic field sensor caused by the magnetic field component in the second direction is avoided.

10. The sensor according to claim 1, wherein the magnetic field sensor is arranged such that the magnetic field component in the second direction cannot cause a rotation of a magnetization of a free layer of the magnetic field sensor that leads to a discontinuous jump in the resistance of the magnetic field sensor.

11. A sensor, comprising:
   a wheel with a plurality of azimuthally distributed structures arranged in a first direction configured to effect a periodically varying magnetic field in a second direction and a third direction upon rotation of the wheel;
   a first magnetic field sensor and a second magnetic field sensor configured to detect components of the magnetic field in the second direction and the third direction;
   wherein the first magnetic field sensor and the second magnetic field sensor are arranged adjacent to the wheel such that the second direction corresponds to a direction of the axis of the wheel and the third direction corresponds to a radial direction of the wheel; and
   wherein the plurality of azimuthally distributed structures of the wheel comprise magnetic poles arranged with alternating polarity.

12. The sensor according to claim 11, wherein the first magnetic field sensor comprises a first magneto resistive sensor and the second magnetic field sensor comprises a second magneto resistive sensor.

13. The sensor according to claim 12, wherein the first magneto resistive sensor and the second magneto resistive sensor comprise a pinned layer, wherein the pinned layers of the first magneto resistive sensor and the second magneto resistive sensor are premagnetized in the same direction.

14. The sensor according to claim 11, wherein the wheel is arranged to define a plane that is perpendicular to the axis of the wheel, wherein the first magnetic field sensor is arranged on a first side of the plane at a first defined distance to the plane, and wherein the second magnetic field sensor is arranged on a second, opposing side of the plane at a second defined distance to the plane.

15. The sensor according to claim 14, wherein the first magnetic field sensor and the second magnetic field sensor are arranged on a surface normal of the plane of the wheel.

16. The sensor according to claim 14, wherein the first defined distance and the second defined distance are the same distance.

17. The sensor according to claim 11, further comprising an evaluator configured to detect a differential sensor signal of the first magnetic field sensor and the second magnetic field sensor, and evaluate a position, velocity, or acceleration of the wheel based on the detected differential sensor signal.

18. The sensor according to claim 17, wherein the evaluator comprises an evaluation circuit configured to reduce an effect of a background magnetic field.

19. The sensor according to claim 18, wherein the first magnetic field sensor comprises a first magneto resistive sensor and the second magnetic field sensor comprises a second magneto resistive sensor, and wherein the evaluation circuit of the evaluator comprises the resistances of the first magneto resistive sensor and the second magneto resistive sensor connected to a half bridge.

20. The sensor according to claim 11, further comprising an additional magnetic field sensor arranged adjacent to the wheel between the first magnetic field sensor and the second magnetic field sensor, wherein the additional magnetic field sensor is configured to detect a component of the magnetic field in the first direction, wherein the first direction is perpendicular to the second direction and to the third direction.

21. The sensor according to claim 20, further comprising an evaluator configured to detect a sensor signal of the first magnetic field sensor or the second magnetic field sensor and detect an additional sensor signal of the additional magnetic field sensor, and evaluate a position, velocity, or acceleration of the wheel based on the detected sensor signal and evaluate a direction of rotation of the wheel based on the detected additional sensor signal.

22. The sensor according to claim 11, further comprising a third magnetic field sensor and a fourth magnetic field sensor each configured to detect components of the magnetic field in the second direction and the third direction, wherein the third magnetic field sensor and the fourth magnetic field sensor are arranged adjacent to the wheel.

23. The sensor according to claim 22, wherein the first magnetic field sensor comprises a first magneto resistive sensor, the second magnetic field sensor comprises a second magneto resistive sensor, the third magnetic field sensor comprises a third magneto resistive sensor and the fourth magnetic field sensor comprises a fourth magneto resistive sensor.

24. The sensor according to claim 22, wherein the wheel is arranged to define a plane that is perpendicular to the axis of the wheel, wherein the first magnetic field sensor and the third magnetic field sensor are arranged on a first side of the plane at a first defined distance to the plane, and wherein the second magnetic field sensor and the fourth magnetic field sensor are arranged on a second, opposing side of the plane at a second defined distance to the plane.

25. The sensor according to claim 22, further comprising an evaluator configured to detect a sensor signal of the first, the second, the third or the fourth magnetic field sensor, and evaluate a position, velocity, or acceleration of the wheel based on the detected sensor signal.

26. The sensor according to claim 25, wherein the evaluator comprises an evaluation circuit configured to reduce an effect of a background magnetic field.

27. The sensor according to claim 26, wherein the first magnetic field sensor comprises a first magneto resistive sensor, the second magnetic field sensor comprises a second magneto resistive sensor, the third magnetic field sensor comprises a third magneto resistive sensor and the fourth magnetic field sensor comprises a fourth magneto resistive sensor, and wherein the evaluation circuit comprises the resistances of the first, the second, the third and the fourth magneto resistive sensors connected to a Wheatstone-bridge.

28. A method for measuring a movement of a body, wherein the body comprises a plurality of structures arranged in a first direction to effect a periodically varying magnetic field in a second direction and a third direction upon movement of the body in the first direction, wherein the plurality of structures of the body comprise magnetic poles arranged with alternating polarity, the method comprising:
   detecting components of the magnetic field in the second direction and in the third direction with a magnetic field sensor;
   wherein the magnetic field sensor is arranged adjacent to the wheel such that the second direction is perpendicular to the first direction and such that the third direction is perpendicular to the first direction and to the second direction.

29. The method of claim 28, further comprising:
   detecting a sensor signal of the magnetic field sensor; and
   evaluating a position, velocity or acceleration of the body based on the detected sensor signal.

30. The method of claim 28, further comprising:
detecting a component of the magnetic field in the first direction with an additional magnetic field sensor.

31. The method of claim 30, further comprising:
detecting a sensor signal of the magnetic field sensor;
detecting an additional sensor signal of the additional magnetic field sensor;
evaluating a position, velocity or acceleration of the body based on the detected sensor signal; and
evaluating a direction of movement of the body based on the detected additional sensor signal.

32. A method for manufacturing a sensor, the method comprising the following steps:
providing a body with a plurality of structures arranged in a first direction to effect a periodically varying magnetic field in a second direction and a third direction upon movement of the body in the first direction, wherein the plurality of structures of the body comprise magnetic poles arranged with alternating polarity; and
providing a magnetic field sensor configured to detect components of the magnetic field in the second direction and in the third direction;
wherein the magnetic field sensor is arranged adjacent to body such that the second direction is perpendicular to the first direction and such that the third direction is perpendicular to the first direction and to the second direction.

33. The method of claim 32, further comprising:
providing an evaluator configured to detect a sensor signal of the magnetic field sensor and evaluate a position, velocity, or acceleration of the body based on the detected sensor signal.

34. The method of claim 32, further comprising:
providing an additional magnetic field sensor to detect a component of the magnetic field in the first direction;
wherein the additional magnetic field sensor is arranged adjacent to the body.

35. The method of claim 34, wherein the magnetic field sensor comprises a first magnetic field sensor and a second magnetic field sensor, further comprising: providing an evaluator configured to detect a sensor signal that depends on a resistance of the first magnetic field sensor or the second magnetic field sensor and detect an additional sensor signal of the additional magnetic field sensor, and evaluate a position, velocity, or acceleration of the body based on the detected sensor signal and evaluate a direction of movement of the body based on the detected additional sensor signal.

* * * * *